United States Patent
Hunter et al.

(10) Patent No.: US 7,057,795 B2
(45) Date of Patent: Jun. 6, 2006

(54) MICRO-STRUCTURES WITH INDIVIDUALLY ADDRESSABLE RIBBON PAIRS

(75) Inventors: Jim Hunter, Campbell, CA (US); David Amm, Sunnyvale, CA (US); Christopher Gudeman, Los Gatos, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 211 days.

(21) Appl. No.: 10/225,370

(22) Filed: Aug. 20, 2002

(65) Prior Publication Data

US 2004/0036950 A1  Feb. 26, 2004

(51) Int. Cl.
G02B 26/00 (2006.01)
G02B 26/08 (2006.01)
G02B 5/18 (2006.01)

(52) U.S. Cl. .............. 359/291; 359/290; 359/295; 359/298; 359/224; 359/572; 359/237

(58) Field of Classification Search ........... 359/290, 359/291, 295, 298, 224, 318, 572, 573, 237, 359/211, 571; 385/18
See application file for complete search history.

(56) References Cited

U.S. PATENT DOCUMENTS

| | | |
|---|---|---|
| 1,525,550 A | 2/1925 | Jenkins |
| 1,548,262 A | 8/1925 | Freedman |
| RE16,767 E | 10/1927 | Jenkins |
| 1,814,701 A | 7/1931 | Ives |
| 2,415,226 A | 2/1947 | Sziklai |
| 2,783,406 A | 2/1957 | Vanderhooft |
| 2,920,529 A | 1/1960 | Blythe |
| 2,991,690 A | 7/1961 | Grey et al. |
| RE25,169 E | 5/1962 | Glenn |
| 3,256,465 A | 6/1966 | Weissenstern et al. |
| 3,388,301 A | 6/1968 | James |
| 3,443,871 A | 5/1969 | Chitayat |
| 3,553,364 A | 1/1971 | Lee |
| 3,576,394 A | 4/1971 | Lee |
| 3,600,798 A | 8/1971 | Lee |
| 3,656,837 A | 4/1972 | Sandbank |
| 3,657,610 A | 4/1972 | Yamamoto et al. |

(Continued)

FOREIGN PATENT DOCUMENTS

DE   32 33 195 A1   3/1983

(Continued)

OTHER PUBLICATIONS

R. Apte, "Grating Light Valves for High Resolution Displays", Solid State Sensors and Actuators Workshop, Ph D. Dissertation, Stanford University (Jun. 1994).

(Continued)

*Primary Examiner*—Georgia Epps
*Assistant Examiner*—Jack Dinh
(74) *Attorney, Agent, or Firm*—Okamoto & Benedicto LLP

(57) ABSTRACT

An optical MEM devices which utilizes individually addressable ribbon pairs configured to modulate light is disclosed. The ribbon pairs preferably comprise silicon nitride with a reflective aluminum layers, wherein at least one ribbon from each ribbon pair is in electrical communication with a driver circuit for controllably addressing the ribbon pairs individually. The ribbons are preferably configured to modulate light having wavelengths in a range of 0.4 to 2.0 microns suitable for display and optical communication technologies. The system preferably comprises optical fibers for transmitting light to individually addressable ribbon pairs and for transmitting reflected light from individually addressable ribbon pairs.

7 Claims, 5 Drawing Sheets

U.S. PATENT DOCUMENTS

| | | |
|---|---|---|
| 3,693,239 A | 9/1972 | Dix |
| 3,743,507 A | 7/1973 | Ih et al. |
| 3,752,563 A | 8/1973 | Torok et al. |
| 3,781,465 A | 12/1973 | Ernstoff et al. |
| 3,783,184 A | 1/1974 | Ernstoff et al. |
| 3,792,916 A | 2/1974 | Sarna |
| 3,802,769 A | 4/1974 | Rotz et al. |
| 3,811,186 A | 5/1974 | Larnerd et al. |
| 3,861,784 A | 1/1975 | Torok |
| 3,862,360 A | 1/1975 | Dill et al. |
| 3,871,014 A | 3/1975 | King et al. |
| 3,886,310 A | 5/1975 | Guldberg et al. |
| 3,896,338 A | 7/1975 | Nathanson et al. |
| 3,915,548 A | 10/1975 | Opittek |
| 3,935,499 A | 1/1976 | Oess |
| 3,935,500 A | 1/1976 | Oess et al. |
| 3,938,881 A | 2/1976 | Biegelsen et al. |
| 3,941,456 A | 3/1976 | Schilz et al. |
| 3,942,245 A | 3/1976 | Jackson et al. |
| 3,943,281 A | 3/1976 | Keller et al. |
| 3,947,105 A | 3/1976 | Smith |
| 3,969,611 A | 7/1976 | Fonteneau |
| 3,980,476 A | 9/1976 | Wysocki |
| 3,991,416 A | 11/1976 | Byles et al. |
| 4,001,663 A | 1/1977 | Bray |
| 4,004,849 A | 1/1977 | Shattuck |
| 4,006,968 A | 2/1977 | Ernstoff et al. |
| 4,009,939 A | 3/1977 | Okano |
| 4,011,009 A | 3/1977 | Lama et al. |
| 4,012,116 A | 3/1977 | Y vick |
| 4,012,835 A | 3/1977 | Wallick |
| 4,017,158 A | 4/1977 | Booth |
| 4,020,381 A | 4/1977 | Oess et al. |
| 4,021,766 A | 5/1977 | Aine |
| 4,034,211 A | 7/1977 | Horst et al. |
| 4,034,399 A | 7/1977 | Drukier et al. |
| 4,035,068 A | 7/1977 | Rawson |
| 4,067,129 A | 1/1978 | Abramson et al. |
| 4,084,437 A | 4/1978 | Finnegan |
| 4,090,219 A | 5/1978 | Ernstoff et al. |
| 4,093,346 A | 6/1978 | Nishino et al. |
| 4,093,921 A | 6/1978 | Buss |
| 4,093,922 A | 6/1978 | Buss |
| 4,100,579 A | 7/1978 | Ernstoff |
| 4,103,273 A | 7/1978 | Keller |
| 4,126,380 A | 11/1978 | Borm |
| 4,127,322 A | 11/1978 | Jacobson et al. |
| 4,135,502 A | 1/1979 | Peck |
| 4,139,257 A | 2/1979 | Matsumoto |
| 4,143,943 A | 3/1979 | Rawson |
| 4,163,570 A | 8/1979 | Greenaway |
| 4,184,700 A | 1/1980 | Greenaway |
| 4,185,891 A | 1/1980 | Kaestner |
| 4,190,855 A | 2/1980 | Inoue |
| 4,195,915 A | 4/1980 | Lichty et al. |
| 4,205,428 A | 6/1980 | Ernstoff et al. |
| 4,211,918 A | 7/1980 | Nyfeler et al. |
| 4,223,050 A | 9/1980 | Nyfeler et al. |
| 4,225,913 A | 9/1980 | Bray |
| 4,249,796 A | 2/1981 | Sincerbox et al. |
| 4,250,217 A | 2/1981 | Greenaway |
| 4,250,393 A | 2/1981 | Greenaway |
| 4,256,787 A | 3/1981 | Shaver et al. |
| 4,257,016 A | 3/1981 | Kramer, Jr. et al. |
| 4,290,672 A | 9/1981 | Whitefield |
| 4,295,145 A | 10/1981 | Latta |
| 4,311,999 A | 1/1982 | Upton et al. |
| 4,327,411 A | 4/1982 | Turner |
| 4,327,966 A | 5/1982 | Bloom |
| 4,331,972 A | 5/1982 | Rajchman |
| 4,336,982 A | 6/1982 | Rector, Jr. |
| 4,338,660 A | 7/1982 | Kelley et al. |
| 4,343,535 A | 8/1982 | Bleha, Jr. |
| 4,346,965 A | 8/1982 | Sprague et al. |
| 4,348,079 A | 9/1982 | Johnson |
| 4,355,463 A | 10/1982 | Burns |
| 4,361,384 A | 11/1982 | Bosserman |
| 4,369,524 A | 1/1983 | Rawson et al. |
| 4,374,397 A | 2/1983 | Mir |
| 4,389,096 A | 6/1983 | Hori et al. |
| 4,391,490 A | 7/1983 | Hartk |
| 4,396,246 A | 8/1983 | Holman |
| 4,398,798 A | 8/1983 | Krawczak et al. |
| 4,400,740 A | 8/1983 | Traino et al. |
| 4,408,884 A | 10/1983 | Kleinknecht et al. |
| 4,414,583 A | 11/1983 | Hooker, III |
| 4,417,386 A | 11/1983 | Exner |
| 4,418,397 A | 11/1983 | Brantingham et al. |
| 4,420,717 A | 12/1983 | Wallace et al. |
| 4,422,099 A | 12/1983 | Wolfe |
| 4,426,768 A | 1/1984 | Black et al. |
| 4,430,584 A | 2/1984 | Someshwar et al. |
| 4,435,041 A | 3/1984 | Torok et al. |
| 4,440,839 A | 4/1984 | Mottier |
| 4,443,819 A | 4/1984 | Funada et al. |
| 4,443,845 A | 4/1984 | Hamilton et al. |
| 4,447,881 A | 5/1984 | Brantingham et al. |
| 4,454,591 A | 6/1984 | Lou |
| 4,456,338 A | 6/1984 | Gelbart |
| 4,460,907 A | 7/1984 | Nelson |
| 4,462,046 A | 7/1984 | Spight |
| 4,467,342 A | 8/1984 | Tower |
| 4,468,725 A | 8/1984 | Venturini |
| 4,483,596 A | 11/1984 | Marshall |
| 4,484,188 A | 11/1984 | Ott |
| 4,487,677 A | 12/1984 | Murphy |
| 4,492,435 A | 1/1985 | Banton et al. |
| 4,503,494 A | 3/1985 | Hamilton et al. |
| 4,511,220 A | 4/1985 | Scully |
| 4,538,883 A | 9/1985 | Sprague et al. |
| 4,545,610 A | 10/1985 | Lakritz et al. |
| 4,556,378 A | 12/1985 | Nyfeler et al. |
| 4,558,171 A | 12/1985 | Gantley et al. |
| 4,561,011 A | 12/1985 | Kohara et al. |
| 4,561,044 A | 12/1985 | Ogura et al. |
| 4,566,935 A | 1/1986 | Hornbeck |
| 4,567,585 A | 1/1986 | Gelbart |
| 4,571,041 A | 2/1986 | Gaudyn |
| 4,571,603 A | 2/1986 | Hornbeck et al. |
| 4,577,932 A | 3/1986 | Gelbart |
| 4,577,933 A | 3/1986 | Yip et al. |
| 4,588,957 A | 5/1986 | Balant et al. |
| 4,590,548 A | 5/1986 | Maytum |
| 4,594,501 A | 6/1986 | Culley et al. |
| 4,596,992 A | 6/1986 | Hornbeck |
| 4,615,595 A | 10/1986 | Hornbeck |
| 4,623,219 A | 11/1986 | Trias |
| 4,636,039 A | 1/1987 | Turner |
| 4,636,866 A | 1/1987 | Hattori |
| 4,641,193 A | 2/1987 | Glenn |
| 4,645,881 A | 2/1987 | LeToumelin et al. |
| 4,646,158 A | 2/1987 | Ohno et al. |
| 4,649,085 A | 3/1987 | Landram |
| 4,649,432 A | 3/1987 | Watanabe |
| 4,652,932 A | 3/1987 | Miyajima et al. |
| 4,655,539 A | 4/1987 | Caulfield et al. |
| 4,660,938 A | 4/1987 | Kazan |
| 4,661,828 A | 4/1987 | Miller, Jr. et al. |
| 4,662,746 A | 5/1987 | Hornbeck |
| 4,663,670 A | 5/1987 | Ito et al. |
| 4,687,326 A | 8/1987 | Corby, Jr. |
| 4,698,602 A | 10/1987 | Armitage |
| 4,700,276 A | 10/1987 | Freyman et al. |
| 4,707,064 A | 11/1987 | Dobrowolski et al. |

| Patent No. | Date | Inventor |
|---|---|---|
| 4,709,995 A | 12/1987 | Kuribayashi et al. |
| 4,710,732 A | 12/1987 | Hornbeck |
| 4,711,526 A | 12/1987 | Hennings et al. |
| 4,714,326 A | 12/1987 | Usui et al. |
| 4,717,066 A | 1/1988 | Goldenberg et al. |
| 4,719,507 A | 1/1988 | Bos |
| 4,721,629 A | 1/1988 | Sakai et al. |
| 4,722,593 A | 2/1988 | Shimazaki |
| 4,724,467 A | 2/1988 | Yip et al. |
| 4,728,185 A | 3/1988 | Thomas |
| 4,743,091 A | 5/1988 | Gelbart |
| 4,744,633 A | 5/1988 | Sheiman |
| 4,747,671 A | 5/1988 | Takahashi et al. |
| 4,751,509 A | 6/1988 | Kubota et al. |
| 4,761,253 A | 8/1988 | Antes |
| 4,763,975 A | 8/1988 | Scifres et al. |
| 4,765,865 A | 8/1988 | Gealer et al. |
| 4,772,094 A | 9/1988 | Sheiman |
| 4,797,694 A | 1/1989 | Agostinelli et al. |
| 4,797,918 A | 1/1989 | Lee et al. |
| 4,801,194 A | 1/1989 | Agostinelli et al. |
| 4,803,560 A | 2/1989 | Matsunaga et al. |
| 4,804,641 A | 2/1989 | Arlt et al. |
| 4,807,021 A | 2/1989 | Okumura |
| 4,807,965 A | 2/1989 | Garakani |
| 4,809,078 A | 2/1989 | Yabe et al. |
| 4,811,082 A | 3/1989 | Jacobs et al. |
| 4,811,210 A | 3/1989 | McAulay |
| 4,814,759 A | 3/1989 | Gombrich et al. |
| 4,817,850 A | 4/1989 | Wiener-Avnear et al. |
| 4,824,200 A | 4/1989 | Isono et al. |
| 4,827,391 A | 5/1989 | Sills |
| 4,829,365 A | 5/1989 | Eichenlaub |
| 4,836,649 A | 6/1989 | Ledebuhr et al. |
| 4,856,863 A | 8/1989 | Sampsell et al. |
| 4,856,869 A | 8/1989 | Sakata et al. |
| 4,859,012 A | 8/1989 | Cohn |
| 4,859,060 A | 8/1989 | Katagiri et al. |
| 4,866,488 A | 9/1989 | Frensley |
| 4,882,683 A | 11/1989 | Rupp et al. |
| 4,893,509 A | 1/1990 | MacIver et al. |
| 4,896,325 A | 1/1990 | Coldren |
| 4,896,948 A | 1/1990 | Dono et al. |
| 4,897,708 A | 1/1990 | Clements |
| 4,902,083 A | 2/1990 | Wells |
| 4,915,463 A | 4/1990 | Barbee, Jr. |
| 4,915,479 A | 4/1990 | Clarke |
| 4,924,413 A | 5/1990 | Suwannukul |
| 4,926,241 A | 5/1990 | Carey |
| 4,930,043 A | 5/1990 | Wiegand |
| 4,934,773 A | 6/1990 | Becker |
| 4,940,309 A | 7/1990 | Baum |
| 4,943,815 A | 7/1990 | Aldrich et al. |
| 4,945,773 A | 8/1990 | Sickafus |
| 4,949,148 A | 8/1990 | Bartelink |
| 4,950,890 A | 8/1990 | Gelbart |
| 4,952,925 A | 8/1990 | Haastert |
| 4,954,789 A | 9/1990 | Sampsell |
| 4,956,619 A | 9/1990 | Hornbeck |
| 4,961,633 A | 10/1990 | Ibrahim et al. |
| 4,963,012 A | 10/1990 | Tracy et al. |
| 4,970,575 A | 11/1990 | Soga et al. |
| 4,978,202 A | 12/1990 | Yang |
| 4,982,184 A | 1/1991 | Kirkwood |
| 4,982,265 A | 1/1991 | Watanabe et al. |
| 4,984,824 A | 1/1991 | Antes et al. |
| 4,999,308 A | 3/1991 | Nishiura et al. |
| 5,003,300 A | 3/1991 | Wells |
| 5,009,473 A | 4/1991 | Hunter et al. |
| 5,013,141 A | 5/1991 | Sakata |
| 5,018,256 A | 5/1991 | Hornbeck |
| 5,022,750 A | 6/1991 | Flasck |
| 5,023,905 A | 6/1991 | Wells et al. |
| 5,024,494 A | 6/1991 | Williams et al. |
| 5,028,939 A | 7/1991 | Hornbeck et al. |
| 5,031,144 A | 7/1991 | Persky |
| 5,035,473 A | 7/1991 | Kuwayama et al. |
| 5,037,173 A | 8/1991 | Sampsell et al. |
| 5,039,628 A | 8/1991 | Carey |
| 5,040,052 A | 8/1991 | McDavid |
| 5,041,395 A | 8/1991 | Steffen |
| 5,041,851 A | 8/1991 | Nelson |
| 5,043,917 A | 8/1991 | Okamoto |
| 5,048,077 A | 9/1991 | Wells et al. |
| 5,049,901 A | 9/1991 | Gelbart |
| 5,058,992 A | 10/1991 | Takahashi |
| 5,060,058 A | 10/1991 | Goldenberg et al. |
| 5,061,049 A | 10/1991 | Hornbeck |
| 5,066,614 A | 11/1991 | Dunaway et al. |
| 5,068,205 A | 11/1991 | Baxter et al. |
| 5,072,239 A | 12/1991 | Mitcham et al. |
| 5,072,418 A | 12/1991 | Boutaud et al. |
| 5,074,947 A | 12/1991 | Estes et al. |
| 5,075,940 A | 12/1991 | Kuriyama et al. |
| 5,079,544 A | 1/1992 | DeMond et al. |
| 5,081,617 A | 1/1992 | Gelbart |
| 5,083,857 A | 1/1992 | Hornbeck |
| 5,085,497 A | 2/1992 | Um et al. |
| 5,089,903 A | 2/1992 | Kuwayama et al. |
| 5,093,281 A | 3/1992 | Eshima |
| 5,096,279 A | 3/1992 | Hornbeck et al. |
| 5,099,353 A | 3/1992 | Hornbeck |
| 5,101,184 A | 3/1992 | Antes |
| 5,101,236 A | 3/1992 | Nelson et al. |
| 5,103,334 A | 4/1992 | Swanberg |
| 5,105,207 A | 4/1992 | Nelson |
| 5,105,299 A | 4/1992 | Anderson et al. |
| 5,105,369 A | 4/1992 | Nelson |
| 5,107,372 A | 4/1992 | Gelbart et al. |
| 5,112,436 A | 5/1992 | Bol |
| 5,113,272 A | 5/1992 | Reamey |
| 5,113,285 A | 5/1992 | Franklin et al. |
| 5,115,344 A | 5/1992 | Jaskie |
| 5,119,204 A | 6/1992 | Hashimoto et al. |
| 5,121,343 A | 6/1992 | Faris |
| 5,126,812 A | 6/1992 | Greiff |
| 5,126,826 A | 6/1992 | Kauchi et al. |
| 5,126,836 A | 6/1992 | Um |
| 5,128,660 A | 7/1992 | DeMond et al. |
| 5,129,716 A | 7/1992 | Holakovszky et al. |
| 5,132,723 A | 7/1992 | Gelbart |
| 5,132,812 A | 7/1992 | Takahashi et al. |
| 5,136,695 A | 8/1992 | Goldshlag et al. |
| 5,137,836 A | 8/1992 | Lam |
| 5,142,303 A | 8/1992 | Nelson |
| 5,142,405 A | 8/1992 | Hornbeck |
| 5,142,677 A | 8/1992 | Ehlig et al. |
| 5,144,472 A | 9/1992 | Sang, Jr. et al. |
| 5,147,815 A | 9/1992 | Casto |
| 5,148,157 A | 9/1992 | Florence |
| 5,148,506 A | 9/1992 | McDonald |
| 5,149,405 A | 9/1992 | Bruns et al. |
| 5,150,205 A | 9/1992 | Um et al. |
| 5,151,718 A | 9/1992 | Nelson |
| 5,151,724 A | 9/1992 | Kikinis |
| 5,151,763 A | 9/1992 | Marek et al. |
| 5,153,770 A | 10/1992 | Harris |
| 5,155,604 A | 10/1992 | Miekka et al. |
| 5,155,615 A | 10/1992 | Tagawa et al. |
| 5,155,778 A | 10/1992 | Magel et al. |
| 5,155,812 A | 10/1992 | Ehlig et al. |
| 5,157,304 A | 10/1992 | Kane et al. |
| 5,159,485 A | 10/1992 | Nelson |
| 5,161,042 A | 11/1992 | Hamada |
| 5,162,787 A | 11/1992 | Thompson et al. |
| 5,164,019 A | 11/1992 | Sinton |

| | | | | | | |
|---|---|---|---|---|---|---|
| 5,165,013 A | 11/1992 | Faris | | 5,262,000 A | 11/1993 | Welbourn et al. |
| 5,168,401 A | 12/1992 | Endriz | | 5,272,473 A | 12/1993 | Thompson et al. |
| 5,168,406 A | 12/1992 | Nelson | | 5,278,652 A | 1/1994 | Urbanus et al. |
| 5,170,156 A | 12/1992 | DeMond et al. | | 5,278,925 A | 1/1994 | Boysel et al. |
| 5,170,269 A | 12/1992 | Lin et al. | | 5,280,277 A | 1/1994 | Hornbeck |
| 5,170,283 A | 12/1992 | O'Brien et al. | | 5,281,887 A | 1/1994 | Engle |
| 5,172,161 A | 12/1992 | Nelson | | 5,281,957 A | 1/1994 | Schoolman |
| 5,172,262 A | 12/1992 | Hornbeck | | 5,285,105 A | 2/1994 | Cain |
| 5,177,724 A | 1/1993 | Gelbart | | 5,285,196 A | 2/1994 | Gale, Jr. |
| 5,178,728 A | 1/1993 | Boysel et al. | | 5,285,407 A | 2/1994 | Gale et al. |
| 5,179,274 A | 1/1993 | Sampsell | | 5,287,096 A | 2/1994 | Thompson et al. |
| 5,179,367 A | 1/1993 | Shimizu | | 5,287,215 A | 2/1994 | Warde et al. |
| 5,181,231 A | 1/1993 | Parikh et al. | | 5,289,172 A | 2/1994 | Gale, Jr. et al. |
| 5,182,665 A | 1/1993 | O'Callaghan et al. | | 5,291,317 A | 3/1994 | Newswanger |
| 5,185,660 A | 2/1993 | Um | | 5,291,473 A | 3/1994 | Pauli |
| 5,185,823 A | 2/1993 | Kaku et al. | | 5,293,511 A | 3/1994 | Poradish et al. |
| 5,188,280 A | 2/1993 | Nakao et al. | | 5,296,408 A | 3/1994 | Wilbarg et al. |
| 5,189,404 A | 2/1993 | Masimo et al. | | 5,296,891 A | 3/1994 | Vogt et al. |
| 5,189,505 A | 2/1993 | Bartelink | | 5,296,950 A | 3/1994 | Lin et al. |
| 5,191,405 A | 3/1993 | Tomita et al. | | 5,298,460 A | 3/1994 | Nishiguchi et al. |
| 5,192,864 A | 3/1993 | McEwen et al. | | 5,299,037 A | 3/1994 | Sakata |
| 5,192,946 A | 3/1993 | Thompson et al. | | 5,299,289 A | 3/1994 | Omae et al. |
| 5,198,895 A | 3/1993 | Vick | | 5,300,813 A | 4/1994 | Joshi et al. |
| D334,557 S | 4/1993 | Hunter et al. ............... D14/114 | | 5,301,062 A | 4/1994 | Takahashi et al. |
| D334,742 S | 4/1993 | Hunter et al. ............... D14/113 | | 5,303,043 A | 4/1994 | Glenn |
| 5,202,785 A | 4/1993 | Nelson | | 5,303,055 A | 4/1994 | Hendrix et al. |
| 5,206,629 A | 4/1993 | DeMond et al. | | 5,307,056 A | 4/1994 | Urbanus |
| 5,206,829 A | 4/1993 | Thakoor et al. | | 5,307,185 A | 4/1994 | Jones et al. |
| 5,208,818 A | 5/1993 | Gelbart et al. | | 5,310,624 A | 5/1994 | Ehrlich |
| 5,208,891 A | 5/1993 | Prysner | | 5,311,349 A | 5/1994 | Anderson et al. |
| 5,210,637 A | 5/1993 | Puzey | | 5,311,360 A | 5/1994 | Bloom et al. ............... 359/572 |
| 5,212,115 A | 5/1993 | Cho et al. | | 5,312,513 A | 5/1994 | Florence et al. |
| 5,212,555 A | 5/1993 | Stoltz | | 5,313,479 A | 5/1994 | Florence |
| 5,212,582 A | 5/1993 | Nelson | | 5,313,648 A | 5/1994 | Ehlig et al. |
| 5,214,308 A | 5/1993 | Nishiquchi et al. | | 5,313,835 A | 5/1994 | Dunn |
| 5,214,419 A | 5/1993 | DeMond et al. | | 5,315,418 A | 5/1994 | Sprague et al. |
| 5,214,420 A | 5/1993 | Thompson et al. | | 5,315,423 A | 5/1994 | Hong |
| 5,216,278 A | 6/1993 | Lin et al. | | 5,315,429 A | 5/1994 | Abramov |
| 5,216,537 A | 6/1993 | Hornbeck | | 5,319,214 A | 6/1994 | Gregory et al. |
| 5,216,544 A | 6/1993 | Horikawa et al. | | 5,319,668 A | 6/1994 | Luecke |
| 5,219,794 A | 6/1993 | Satoh et al. | | 5,319,789 A | 6/1994 | Ehlig et al. |
| 5,220,200 A | 6/1993 | Blanton | | 5,319,792 A | 6/1994 | Ehlig et al. |
| 5,221,400 A | 6/1993 | Staller et al. | | 5,320,709 A | 6/1994 | Bowden et al. |
| 5,221,982 A | 6/1993 | Faris | | 5,321,416 A | 6/1994 | Bassett et al. |
| 5,224,088 A | 6/1993 | Atiya | | 5,323,002 A | 6/1994 | Sampsell et al. |
| D337,320 S | 7/1993 | Hunter et al. ............... D14/113 | | 5,323,051 A | 6/1994 | Adams et al. |
| 5,226,099 A | 7/1993 | Mignardi et al. | | 5,325,116 A | 6/1994 | Sampsell |
| 5,227,910 A * | 7/1993 | Khattak ...................... 359/211 | | 5,327,286 A | 7/1994 | Sampsell et al. |
| 5,229,597 A | 7/1993 | Fukatsu | | 5,329,289 A | 7/1994 | Sakamoto et al. |
| 5,230,005 A | 7/1993 | Rubino et al. | | 5,330,301 A | 7/1994 | Brancher |
| 5,231,363 A | 7/1993 | Sano et al. | | 5,330,878 A | 7/1994 | Nelson |
| 5,231,388 A | 7/1993 | Stoltz | | 5,331,454 A | 7/1994 | Hornbeck |
| 5,231,432 A | 7/1993 | Glenn | | 5,334,991 A | 8/1994 | Wells et al. |
| 5,233,456 A | 8/1993 | Nelson | | 5,339,116 A | 8/1994 | Urbanus et al. |
| 5,233,460 A | 8/1993 | Partlo et al. | | 5,339,177 A | 8/1994 | Jenkins et al. |
| 5,233,874 A | 8/1993 | Putty et al. | | 5,340,772 A | 8/1994 | Rosotker |
| 5,237,340 A | 8/1993 | Nelson | | 5,345,521 A | 9/1994 | McDonald et al. |
| 5,237,435 A | 8/1993 | Kurematsu et al. | | 5,347,321 A | 9/1994 | Gove |
| 5,239,448 A | 8/1993 | Perkins et al. | | 5,347,378 A | 9/1994 | Handschy et al. |
| 5,239,806 A | 8/1993 | Maslakow | | 5,347,433 A | 9/1994 | Sedlmayr |
| 5,240,818 A | 8/1993 | Mignardi et al. | | 5,348,619 A | 9/1994 | Bohannon et al. |
| 5,245,686 A | 9/1993 | Faris et al. | | 5,349,687 A | 9/1994 | Ehlig et al. |
| 5,247,180 A | 9/1993 | Mitcham et al. | | 5,351,052 A | 9/1994 | D'Hont et al. |
| 5,247,593 A | 9/1993 | Lin et al. | | 5,352,926 A | 10/1994 | Andrews |
| 5,249,245 A | 9/1993 | Lebby et al. | | 5,354,416 A | 10/1994 | Okudaira |
| 5,251,057 A | 10/1993 | Guerin et al. | | 5,357,369 A | 10/1994 | Pilling et al. |
| 5,251,058 A | 10/1993 | MacArthur | | 5,357,803 A | 10/1994 | Lane |
| 5,254,980 A | 10/1993 | Hendrix et al. | | 5,359,349 A | 10/1994 | Jambor et al. |
| 5,255,100 A | 10/1993 | Urbanus | | 5,359,451 A | 10/1994 | Gelbart et al. |
| 5,256,869 A | 10/1993 | Lin et al. | | 5,361,131 A | 11/1994 | Tekemori et al. |
| 5,258,325 A | 11/1993 | Spitzer et al. | | 5,363,220 A | 11/1994 | Kuwayama et al. |
| 5,260,718 A | 11/1993 | Rommelmann et al. | | 5,365,283 A | 11/1994 | Doherty et al. |
| 5,260,798 A | 11/1993 | Um et al. | | 5,367,585 A | 11/1994 | Ghezzo et al. |

| Patent | Date | Inventor |
|---|---|---|
| 5,370,742 A | 12/1994 | Mitchell et al. |
| 5,371,543 A | 12/1994 | Anderson |
| 5,371,618 A | 12/1994 | Tai et al. |
| 5,377,705 A | 1/1995 | Smith, Jr. et al. |
| 5,382,961 A | 1/1995 | Gale, Jr. |
| 5,387,924 A | 2/1995 | Gale, Jr. et al. |
| 5,389,182 A | 2/1995 | Mignardi |
| 5,391,881 A | 2/1995 | Jeuch et al. |
| 5,392,140 A | 2/1995 | Ezra et al. |
| 5,392,151 A | 2/1995 | Nelson |
| 5,394,303 A | 2/1995 | Yamaji |
| 5,398,071 A | 3/1995 | Gove et al. |
| 5,399,898 A | 3/1995 | Rostoker |
| 5,404,365 A | 4/1995 | Hiiro |
| 5,404,485 A | 4/1995 | Ban |
| 5,408,123 A | 4/1995 | Murai |
| 5,410,315 A | 4/1995 | Huber |
| 5,411,769 A | 5/1995 | Hornbeck |
| 5,412,186 A | 5/1995 | Gale |
| 5,412,501 A | 5/1995 | Fisli |
| 5,418,584 A | 5/1995 | Larson |
| 5,420,655 A | 5/1995 | Shimizu |
| 5,420,722 A | 5/1995 | Bielak |
| 5,426,072 A | 6/1995 | Finnila |
| 5,427,975 A | 6/1995 | Sparks et al. |
| 5,430,524 A | 7/1995 | Nelson |
| 5,435,876 A | 7/1995 | Alfaro et al. |
| 5,438,477 A | 8/1995 | Pasch |
| 5,439,731 A | 8/1995 | Li et al. |
| 5,442,411 A | 8/1995 | Urbanus et al. |
| 5,442,414 A | 8/1995 | Janssen et al. |
| 5,444,566 A | 8/1995 | Gale et al. |
| 5,445,559 A | 8/1995 | Gale et al. |
| 5,446,479 A | 8/1995 | Thompson et al. |
| 5,447,600 A | 9/1995 | Webb |
| 5,448,314 A | 9/1995 | Heimbuch et al. |
| 5,448,546 A | 9/1995 | Pauli |
| 5,450,088 A | 9/1995 | Meier et al. |
| 5,450,219 A | 9/1995 | Gold et al. |
| 5,451,103 A | 9/1995 | Hatanaka et al. |
| 5,452,024 A | 9/1995 | Sampsell |
| 5,452,138 A | 9/1995 | Mignardi et al. |
| 5,453,747 A | 9/1995 | D'Hont et al. |
| 5,453,778 A | 9/1995 | Pettitt et al. |
| 5,453,803 A | 9/1995 | Shapiro et al. |
| 5,454,160 A | 10/1995 | Nickel |
| 5,454,906 A | 10/1995 | Baker et al. |
| 5,455,445 A | 10/1995 | Kurtz et al. |
| 5,455,455 A | 10/1995 | Badehi |
| 5,455,602 A | 10/1995 | Tew |
| 5,457,493 A | 10/1995 | Leddy et al. |
| 5,457,566 A | 10/1995 | Sampsell et al. |
| 5,457,567 A | 10/1995 | Shinohara |
| 5,458,716 A | 10/1995 | Alfaro et al. |
| 5,459,492 A | 10/1995 | Venkateswar |
| 5,459,528 A | 10/1995 | Pettitt |
| 5,459,592 A | 10/1995 | Shibatani et al. |
| 5,459,610 A | 10/1995 | Bloom et al. |
| 5,461,197 A | 10/1995 | Hiruta et al. |
| 5,461,410 A | 10/1995 | Venkateswar et al. |
| 5,461,411 A | 10/1995 | Florence et al. |
| 5,461,547 A | 10/1995 | Ciupke et al. |
| 5,463,347 A | 10/1995 | Jones et al. |
| 5,463,497 A | 10/1995 | Muraki et al. |
| 5,465,175 A | 11/1995 | Woodgate et al. |
| 5,467,106 A | 11/1995 | Salomon |
| 5,467,138 A | 11/1995 | Gove |
| 5,467,146 A | 11/1995 | Huang et al. |
| 5,469,302 A | 11/1995 | Lim |
| 5,471,341 A | 11/1995 | Warde et al. |
| 5,473,512 A | 12/1995 | Degani et al. |
| 5,475,236 A | 12/1995 | Yoshizaki |
| 5,480,839 A | 1/1996 | Ezawa et al. |
| 5,481,118 A | 1/1996 | Tew |
| 5,481,133 A | 1/1996 | Hsu |
| 5,482,564 A | 1/1996 | Douglas et al. |
| 5,482,818 A | 1/1996 | Nelson |
| 5,483,307 A | 1/1996 | Anderson |
| 5,485,172 A | 1/1996 | Sawachika et al. |
| 5,485,304 A | 1/1996 | Kaeriyama |
| 5,485,354 A | 1/1996 | Ciupke et al. |
| 5,486,698 A | 1/1996 | Hanson et al. |
| 5,486,841 A | 1/1996 | Hara et al. |
| 5,486,946 A | 1/1996 | Jachimowicz et al. |
| 5,488,431 A | 1/1996 | Gove et al. |
| 5,489,952 A | 2/1996 | Gove et al. |
| 5,490,009 A | 2/1996 | Venkateswar et al. |
| 5,491,510 A | 2/1996 | Gove |
| 5,491,612 A | 2/1996 | Nicewarner, Jr. |
| 5,491,715 A | 2/1996 | Flaxl |
| 5,493,177 A | 2/1996 | Muller et al. |
| 5,493,439 A | 2/1996 | Engle |
| 5,497,172 A | 3/1996 | Doherty et al. |
| 5,497,197 A | 3/1996 | Gove et al. |
| 5,497,262 A | 3/1996 | Kaeriyama |
| 5,499,060 A | 3/1996 | Gove et al. |
| 5,499,062 A | 3/1996 | Urbanus |
| 5,500,761 A | 3/1996 | Goossen et al. |
| 5,502,481 A | 3/1996 | Dentinger et al. |
| 5,504,504 A | 4/1996 | Markandey et al. |
| 5,504,514 A | 4/1996 | Nelson |
| 5,504,575 A | 4/1996 | Stafford |
| 5,504,614 A | 4/1996 | Webb et al. |
| 5,506,171 A | 4/1996 | Leonard et al. |
| 5,506,597 A | 4/1996 | Thompson et al. |
| 5,506,720 A | 4/1996 | Yoon |
| 5,508,558 A | 4/1996 | Robinette, Jr. et al. |
| 5,508,561 A | 4/1996 | Tago et al. |
| 5,508,565 A | 4/1996 | Hatakeyama et al. |
| 5,508,750 A | 4/1996 | Hewlett et al. |
| 5,508,840 A | 4/1996 | Vogel et al. |
| 5,508,841 A | 4/1996 | Lin et al. |
| 5,510,758 A | 4/1996 | Fujita et al. |
| 5,510,824 A | 4/1996 | Nelson |
| 5,512,374 A | 4/1996 | Wallace et al. |
| 5,512,748 A | 4/1996 | Hanson |
| 5,515,076 A | 5/1996 | Thompson et al. |
| 5,516,125 A | 5/1996 | McKenna |
| 5,517,340 A | 5/1996 | Doany et al. |
| 5,517,347 A | 5/1996 | Sampsell |
| 5,517,357 A | 5/1996 | Shibayama |
| 5,517,359 A | 5/1996 | Gelbart |
| 5,519,251 A | 5/1996 | Sato et al. |
| 5,519,450 A | 5/1996 | Urbanus et al. |
| 5,521,748 A | 5/1996 | Sarraf |
| 5,523,619 A | 6/1996 | McAllister et al. |
| 5,523,628 A | 6/1996 | Williams et al. |
| 5,523,803 A | 6/1996 | Urbanus et al. |
| 5,523,878 A | 6/1996 | Wallace et al. |
| 5,523,881 A | 6/1996 | Florence et al. |
| 5,523,920 A | 6/1996 | Machuga et al. |
| 5,524,155 A | 6/1996 | Weaver |
| 5,526,834 A | 6/1996 | Mielnik et al. |
| 5,534,107 A | 7/1996 | Gray et al. |
| 5,534,883 A | 7/1996 | Koh |
| 5,539,422 A | 7/1996 | Heacock et al. |
| 5,544,306 A | 8/1996 | Deering et al. |
| 5,552,635 A | 9/1996 | Kim et al. |
| 5,554,304 A | 9/1996 | Suzuki |
| 5,576,878 A | 11/1996 | Henck |
| 5,602,671 A | 2/1997 | Hornbeck |
| 5,606,181 A | 2/1997 | Sakuma et al. |
| 5,606,447 A | 2/1997 | Asada et al. |
| 5,610,438 A | 3/1997 | Wallace et al. |
| 5,623,361 A | 4/1997 | Engle |
| 5,629,566 A | 5/1997 | Doi et al. |

| | | | | | |
|---|---|---|---|---|---|
| 5,629,801 A | 5/1997 | Staker et al. | 5,982,553 A | 11/1999 | Bloom et al. ............... 359/627 |
| 5,640,216 A | 6/1997 | Hasegawa et al. | 5,986,634 A | 11/1999 | Alioshin |
| 5,658,698 A | 8/1997 | Yagi et al. | 5,986,796 A | 11/1999 | Miles |
| 5,661,592 A | 8/1997 | Bornstein et al. ........... 359/291 | 5,995,303 A | 11/1999 | Honguh et al. |
| 5,661,593 A | 8/1997 | Engle | 5,999,319 A | 12/1999 | Castracane |
| 5,663,817 A | 9/1997 | Frapin et al. | 6,004,912 A | 12/1999 | Gudeman |
| 5,668,611 A | 9/1997 | Ernstoff et al. | 6,012,336 A | 1/2000 | Eaton et al. |
| 5,673,139 A | 9/1997 | Johnson | 6,016,222 A | 1/2000 | Setani et al. |
| 5,677,783 A | 10/1997 | Bloom et al. | 6,025,859 A | 2/2000 | Ide et al. |
| 5,689,361 A | 11/1997 | Damen et al. | 6,038,057 A | 3/2000 | Brazas, Jr. et al. |
| 5,691,836 A | 11/1997 | Clark | 6,040,748 A | 3/2000 | Gueissaz |
| 5,694,740 A | 12/1997 | Martin et al. | 6,046,840 A | 4/2000 | Huibers |
| 5,696,560 A | 12/1997 | Songer | 6,055,090 A | 4/2000 | Miles |
| 5,699,740 A | 12/1997 | Gelbart | 6,057,520 A | 5/2000 | Goodwin-Johansson |
| 5,704,700 A | 1/1998 | Kappel et al. | 6,061,166 A | 5/2000 | Furlani et al. |
| 5,707,160 A | 1/1998 | Bowen | 6,061,489 A | 5/2000 | Ezra |
| 5,712,649 A | 1/1998 | Tosaki | 6,062,461 A | 5/2000 | Sparks et al. |
| 5,713,652 A | 2/1998 | Zavracky et al. | 6,064,404 A | 5/2000 | Aras et al. |
| 5,726,480 A | 3/1998 | Pister | 6,069,392 A | 5/2000 | Tai et al. |
| 5,731,802 A | 3/1998 | Aras et al. | 6,071,652 A | 6/2000 | Feldman et al. |
| 5,734,224 A | 3/1998 | Tagawa et al. | 6,075,632 A | 6/2000 | Braun |
| 5,742,373 A | 4/1998 | Alvelda | 6,084,626 A | 7/2000 | Ramanujan et al. |
| 5,744,752 A | 4/1998 | McHerron et al. | 6,088,102 A | 7/2000 | Manhart |
| 5,745,271 A | 4/1998 | Ford et al. | 6,090,717 A | 7/2000 | Powell et al. |
| 5,757,354 A | 5/1998 | Kawamura | 6,091,521 A | 7/2000 | Popovich |
| 5,757,536 A | 5/1998 | Ricco et al. | 6,096,576 A | 8/2000 | Corbin et al. |
| 5,764,280 A | 6/1998 | Bloom et al. | 6,096,656 A | 8/2000 | Matzke et al. |
| 5,768,009 A | 6/1998 | Little | 6,097,352 A | 8/2000 | Zavracky et al. |
| 5,770,473 A | 6/1998 | Hall et al. | 6,101,036 A | 8/2000 | Bloom |
| 5,793,519 A | 8/1998 | Furlani et al. | 6,115,168 A | 9/2000 | Zhao et al. |
| 5,798,743 A | 8/1998 | Bloom | 6,122,299 A | 9/2000 | DeMars et al. |
| 5,798,805 A | 8/1998 | Ooi et al. | 6,123,985 A | 9/2000 | Robinson et al. |
| 5,801,074 A | 9/1998 | Kim et al. | 6,124,145 A | 9/2000 | Stemme et al. |
| 5,802,222 A | 9/1998 | Rasch et al. | 6,130,770 A | 10/2000 | Bloom |
| 5,808,323 A | 9/1998 | Spaeth et al. | 6,144,481 A | 11/2000 | Kowarz et al. |
| 5,808,797 A | 9/1998 | Bloom et al. ............... 359/572 | 6,147,789 A | 11/2000 | Gelbart |
| 5,815,126 A | 9/1998 | Fan et al. | 6,154,259 A | 11/2000 | Hargis et al. |
| 5,825,443 A | 10/1998 | Kawasaki et al. | 6,154,305 A | 11/2000 | Dickensheets et al. |
| 5,832,148 A | 11/1998 | Yariv | 6,163,026 A | 12/2000 | Bawolek et al. |
| 5,835,255 A | 11/1998 | Miles | 6,163,402 A | 12/2000 | Chou et al. |
| 5,835,256 A | 11/1998 | Huibers | 6,169,624 B1 | 1/2001 | Godil et al. |
| 5,837,562 A | 11/1998 | Cho | 6,172,796 B1 | 1/2001 | Kowarz et al. |
| 5,841,579 A | 11/1998 | Bloom et al. ............... 359/572 | 6,172,797 B1 | 1/2001 | Huibers |
| 5,841,929 A | 11/1998 | Komatsu et al. | 6,177,980 B1 | 1/2001 | Johnson |
| 5,844,711 A | 12/1998 | Long, Jr. | 6,181,458 B1 | 1/2001 | Brazas, Jr. et al. |
| 5,847,859 A | 12/1998 | Murata ....................... 359/201 | 6,188,519 B1 | 2/2001 | Johnson |
| 5,862,164 A | 1/1999 | Hill | 6,195,196 B1 | 2/2001 | Kimura et al. |
| 5,868,854 A | 2/1999 | Kojima et al. | 6,197,610 B1 | 3/2001 | Toda |
| 5,886,675 A | 3/1999 | Aye et al. | 6,210,988 B1 | 4/2001 | Howe et al. |
| 5,892,505 A | 4/1999 | Tropper | 6,215,579 B1 | 4/2001 | Bloom et al. |
| 5,895,233 A | 4/1999 | Higashi et al. | 6,219,015 B1 | 4/2001 | Bloom et al. |
| 5,898,515 A | 4/1999 | Furlani et al. | 6,222,954 B1 | 4/2001 | Riza |
| 5,903,243 A | 5/1999 | Jones | 6,229,650 B1 | 5/2001 | Reznichenko et al. |
| 5,903,395 A | 5/1999 | Rallison et al. | 6,229,683 B1 | 5/2001 | Goodwin-Johansoon |
| 5,904,737 A | 5/1999 | Preston et al. | 6,241,143 B1 | 6/2001 | Kuroda |
| 5,910,856 A | 6/1999 | Ghosh et al. | 6,249,381 B1 | 6/2001 | Suganuma |
| 5,912,094 A | 6/1999 | Aksyuk et al. | 6,251,842 B1 | 6/2001 | Gudeman |
| 5,912,608 A | 6/1999 | Asada | 6,252,697 B1 | 6/2001 | Hawkins et al. |
| 5,914,801 A | 6/1999 | Dhuler et al. | 6,254,792 B1 | 7/2001 | Van Buskirk et al. |
| 5,915,168 A | 6/1999 | Salatino et al. | 6,261,494 B1 | 7/2001 | Zavracky et al. |
| 5,919,548 A | 7/1999 | Barron et al. ............... 428/138 | 6,268,952 B1 | 7/2001 | Godil et al. ................ 359/291 |
| 5,920,411 A | 7/1999 | Duck et al. | 6,271,145 B1 | 8/2001 | Toda |
| 5,920,418 A | 7/1999 | Shiono et al. | 6,271,808 B1 | 8/2001 | Corbin |
| 5,923,475 A | 7/1999 | Kurtz et al. | 6,274,469 B1 | 8/2001 | Yu |
| 5,926,309 A | 7/1999 | Little | 6,282,213 B1 | 8/2001 | Gutin et al. |
| 5,926,318 A | 7/1999 | Hebert | 6,286,231 B1 | 9/2001 | Bergman et al. |
| 5,942,791 A | 8/1999 | Shorrocks et al. | 6,290,859 B1 | 9/2001 | Fleming et al. |
| 5,949,390 A | 9/1999 | Nomura et al. | 6,290,864 B1 | 9/2001 | Patel et al. |
| 5,949,570 A | 9/1999 | Shiono et al. | 6,300,148 B1 | 10/2001 | Birdsley et al. |
| 5,953,161 A | 9/1999 | Troxell et al. | 6,303,986 B1 | 10/2001 | Shook |
| 5,955,771 A | 9/1999 | Kurtz et al. | 6,310,018 B1 | 10/2001 | Behr et al. |
| 5,963,788 A | 10/1999 | Barron et al. | 6,313,901 B1 | 11/2001 | Cacharelis |
| 5,978,127 A | 11/1999 | Berg | 6,323,984 B1 | 11/2001 | Trisnadi |

| | | | | | |
|---|---|---|---|---|---|
| 6,327,071 B1 | 12/2001 | Kimura | EP | 1 014 143 A1 | 6/2000 |
| 6,342,960 B1 | 1/2002 | McCullough | EP | 1 040 927 A2 | 10/2000 |
| 6,346,430 B1 | 2/2002 | Raj et al. | GB | 2 117 564 A | 10/1983 |
| 6,356,577 B1 | 3/2002 | Miller | GB | 2 118 365 A | 10/1983 |
| 6,356,689 B1 | 3/2002 | Greywall | GB | 2 266 385 A | 10/1993 |
| 6,359,333 B1 | 3/2002 | Wood et al. | GB | 2 296 152 A | 6/1996 |
| 6,384,959 B1 | 5/2002 | Furlani et al. | GB | 2 319 424 A | 5/1998 |
| 6,387,723 B1 | 5/2002 | Payne et al. | JP | 53-39068 | 4/1978 |
| 6,392,309 B1 | 5/2002 | Wataya et al. | JP | 55-111151 | 8/1980 |
| 6,396,789 B1 | 5/2002 | Guerra et al. | JP | 57-31166 | 2/1982 |
| 6,418,152 B1 | 7/2002 | Davis | JP | 57-210638 | 12/1982 |
| 6,421,179 B1 | 7/2002 | Gutin et al. | JP | 60-49638 | 3/1985 |
| 6,438,954 B1 | 8/2002 | Goetz et al. | JP | 60-94756 | 5/1985 |
| 6,445,502 B1 | 9/2002 | Islam et al. ............... 359/571 | JP | 60-250639 | 12/1985 |
| 6,452,260 B1 | 9/2002 | Corbin et al. | JP | 61-142750 | 6/1986 |
| 6,466,354 B1 | 10/2002 | Gudeman | JP | 61-145838 | 7/1986 |
| 6,479,811 B1 | 11/2002 | Kruschwitz et al. | JP | 63-234767 | 9/1988 |
| 6,480,634 B1 | 11/2002 | Corrigan | JP | 63-305323 | 12/1988 |
| 6,497,490 B1 | 12/2002 | Miller | JP | 1-155637 | 6/1989 |
| 6,525,863 B1 | 2/2003 | Riza | JP | 40-1155637 | 6/1989 |
| 6,549,694 B1 * | 4/2003 | Makino et al. ............... 385/18 | JP | 2219092 | 8/1990 |
| 6,563,974 B1 | 5/2003 | Riza | JP | 4-333015 | 11/1992 |
| 6,565,222 B1 | 5/2003 | Ishii et al. | JP | 7-281161 | 10/1995 |
| 6,569,717 B1 | 5/2003 | Murade | JP | 3288369 | 3/2002 |
| 6,639,722 B1 * | 10/2003 | Amm et al. ............... 359/571 | WO | WO 90/13913 | 11/1990 |
| 2001/0019454 A1 | 9/2001 | Tadic-Galeb et al. ....... 359/649 | WO | WO 92/12506 | 7/1992 |
| 2002/0015230 A1 | 2/2002 | Pilossof et al. ............. 359/558 | WO | WO 93/02269 | 2/1993 |
| 2002/0021485 A1 | 2/2002 | Pilossof ..................... 359/295 | WO | WO 93/09472 | 5/1993 |
| 2002/0079432 A1 | 6/2002 | Lee et al. ................... 250/216 | WO | WO 93/18428 | 9/1993 |
| 2002/0105725 A1 | 8/2002 | Sweatt et al. ............... 359/566 | WO | WO 93/22694 | 11/1993 |
| 2002/0112746 A1 | 8/2002 | DeYoung et al. ............. 134/36 | WO | WO 94/09473 | 4/1994 |
| 2002/0131228 A1 | 9/2002 | Potter | WO | WO 94/29761 | 12/1994 |
| 2002/0131230 A1 | 9/2002 | Potter ......................... 361/277 | WO | WP 95/11473 | 4/1995 |
| 2002/0135708 A1 | 9/2002 | Murden et al. | WO | WO 96/02941 | 2/1996 |
| 2002/0176151 A1 | 11/2002 | Moon et al. | WO | WO 96/08031 | 3/1996 |
| 2002/0195418 A1 | 12/2002 | Kowarz et al. | WO | WO 96/41217 | 12/1996 |
| 2002/0196492 A1 | 12/2002 | Trisnadi et al. | WO | WO 96/41224 | 12/1996 |
| 2003/0056078 A1 | 3/2003 | Johansson et al. | WO | WO 97/22033 | 6/1997 |
| | | | WO | WO 97/26569 | 7/1997 |
| FOREIGN PATENT DOCUMENTS | | | WO | WO 98/05935 | 2/1998 |
| | | | WO | WO 98/24240 | 6/1998 |
| DE | 43 23 799 A1 | 1/1994 | WO | WO 98/41893 | 9/1998 |
| DE | 197 23 618 A1 | 12/1997 | WO | WO 99/07146 | 2/1999 |
| DE | 197 51 716 A1 | 5/1998 | WO | WO 99/12208 | 3/1999 |
| DE | 198 46 532 C1 | 5/2000 | WO | WO 99/23520 | 5/1999 |
| EP | 0 089 044 A2 | 9/1983 | WO | WO 99/34484 | 7/1999 |
| EP | 0 261 901 A2 | 3/1988 | WO | WO 99/59335 | 11/1999 |
| EP | 0 314 437 A1 | 10/1988 | WO | WO 99/63388 | 12/1999 |
| EP | 0 304 263 A2 | 2/1989 | WO | WO 99/67671 | 12/1999 |
| EP | 0 306 308 A2 | 3/1989 | WO | WO 00/04718 | 1/2000 |
| EP | 0 322 714 A2 | 7/1989 | WO | WO 00/07225 | 2/2000 |
| EP | 0 627 644 A3 | 9/1990 | WO | WO 01/04674 A1 | 1/2001 |
| EP | 0 417 039 A1 | 3/1991 | WO | WO 01/006297 A3 | 1/2001 |
| EP | 0 423 513 A2 | 4/1991 | WO | WO 01/57581 A3 | 8/2001 |
| EP | 0 436 738 A1 | 7/1991 | WO | WO 02/025348 A3 | 3/2002 |
| EP | 0 458 316 A2 | 11/1991 | WO | WO 02/31575 A2 | 4/2002 |
| EP | 0 477 566 A2 | 4/1992 | WO | WO 02/058111 A2 | 7/2002 |
| EP | 0 488 326 A3 | 6/1992 | WO | WO 02/065184 A3 | 8/2002 |
| EP | 0 499 566 A2 | 8/1992 | WO | WO 02/073286 A2 | 9/2002 |
| EP | 0 528 646 A1 | 2/1993 | WO | WO 02/084375 A1 | 10/2002 |
| EP | 0 530 760 A2 | 3/1993 | WO | WO 02/084397 A3 | 10/2002 |
| EP | 0 550 189 A1 | 7/1993 | WO | WO 03/001281 A1 | 1/2003 |
| EP | 0 610 665 A1 | 8/1994 | WO | WO 03/001716 A1 | 1/2003 |
| EP | 0 627 644 A2 | 12/1994 | WO | WO 03/012523 A1 | 2/2003 |
| EP | 0 627 850 A1 | 12/1994 | WO | WO 03/016965 A1 | 2/2003 |
| EP | 0 643 314 A2 | 3/1995 | WO | WO 03/023849 A1 | 3/2003 |
| EP | 0 654 777 A1 | 5/1995 | WO | WO 03/025628 A2 | 3/2003 |
| EP | 0 658 868 A1 | 6/1995 | | | |
| EP | 0 658 830 A1 | 12/1995 | | OTHER PUBLICATIONS | |
| EP | 0 689 078 A1 | 12/1995 | | | |
| EP | 0 801 319 A1 | 10/1997 | O. Solgaard, "Integrated Semiconductor Light Modulators for Fiber-Optic and Display Applications", Ph.D. Dissertation, Stanford University Feb., 1992. | | |
| EP | 0 851 492 A2 | 7/1998 | | | |
| EP | 1 003 071 A2 | 5/2000 | | | |

J. Neff, "Two-Dimensional Spatial Light Modulators: A Tutorial", Proceedings of the IEEE, vol. 78, No. 5 (May 1990), pp. 826-855.

R. Gerhard-Multhaupt, "Viscoelastic Spatial Light Modulators and Schlieren-Optical Systems for HDTV Projection Displays" SPIE vol. 1255 Large Screen Projection Displays 11 (1990), pp. 69-78.

R. Gerhard-Multhaupt, "Light-Valve Technologies for High-Definition Television Projection Displays", Displays vol. 12, No. 3/4 (1991), pp. 115-128.

O. Solgaard, F. Sandejas, and D. Bloom, "Deformable Grating Optical Modulator," Optics Letters, vol. 17, No. 9, May 1, 1992, New York, USA, pp. 688-690.

F. Sandejas, R. Apte, W. Banyai, and D. Bloom, "Surface Microfabrication of Deformable Grating Valve for High Resolution Displays," The 7th International Conference on Solid-State Sensors and Actuators.

P. Alvelda, "High-Efficiency Color Microdisplays," SID 95 Digest, pp. 307-311, 1995.

Worboys et al., "Miniature Display Technology for Integrated Helmut Systems," GEC Journal of Research, vol. 10, No. 2, pp. 111-118, Chelmsford, Essex, GB 1993.

M. Farn et al., "Color Separation by use of Binary Optics," Optics Letters, vol. 18:15 pp. 1214-1216, 1993.

P. Alvelda, "VLSI Microdisplays and Optoelectric Technology," MIT, pp. 1-93, 1995.

P. Alvelda, "VLSI Microdisplay Technology," Oct. 14, 1994.

D. Rowe, "Laser Beam Scanning," SPIE, vol. 2088, Oct. 5, 1993, 18-26.

L. Hornbeck, "Deformable-Mirror Spatial Light Modulators," Spatial Light Modulators and Applications III, Aug. 8, CA 1989, pp. 86-102.

Russick et al., "Supercritical Carbon Dioxide Extraction of Solvent from Micromachined Structures," Supercritical Fluids, Chapter 18, American Chemical Society, pp. 255-269, 1997.

Buhler et al., "Linear Array of Complementary Metal Oxide Semiconductor Double-Pass Metal Micromirrors," Optical Engineering, vol. 36, No. 5, pp. 1391-1398, May 1997.

Gani et al., "Variable Gratings for Optical Switching: Rigorous Electromagnetic Simulation and Design," Optical Engineering, vol. 38, No. 3, pp. 552-557, Mar. 1999.

R. Tepe, et al. "Viscoelastic Spatial Light Modulator with Active Matrix Addressing," Applied Optics, vol. 28, No. 22, New York, USA, pp. 4826-4834, Nov. 15, 1989.

W. Brinker, et al., "Deformation Behavior of Thin Viscoelastic Layers Used in an Active-Matrix-Addressed Spatial Light Modulator," SPIE vol. 1018, pp. 79-85, Germany, 1988.

T. Utsunomiya and H. Sato, "Electrically Deformable Echellette Grating and its Application to Tunable Laser Resonator," Electronics and Communications in Japan, vol. 63-c, No. 10, pp. 94-100, Japan, 1980.

Burns, D.M. et al., *Development of microelectromechanical variable blaze gratings,* Sensors and Actuators A, pp. 7-15, 1998.

R.N. Thomas, et al., "The Mirror-Matrix Tube: A Novel Light Valve for Projection Displays", IEEE Transactions on Electron Devices, vol. ED-22, No. 9, pp. 765-775, Sep. 1975.

J. Guldberg, et al., "An Aluminum/SiO2/Silicon-on-Sapphire Light Valve Matrix for Projection Displays," Applied Physics Letters, vol. 26, No. 7, pp. 391-393, Apr. 1975.

"Kitchen Computer", IBM Technical Disclosure Bulletin, vol. 37, No. 12, pp. 223-225, Dec. 1994.

"Image Orientation Sensing and Correction for Notepads", Research Disclosure, No. 34788, p. 217, Mar. 1993.

Beck Mason et al., "Directly Modulated Sampled Grating DBR Lasers for Long-Haul WDM Communication Systems" IEEE Photonics Technology Letters, vol. 9, No. 3, Mar. 1997.pp. 377 of 379.

N. J. Frigo et al., "A Wavelength-Division Multiplexed Passive Optical Network with Cost-Shared Components", IEEE Photonics Technology Letters, vol. 6, No. 11, Nov. 1994, pp. 1365 of 1367.

M. S. Goodman et al., "The LAMBDANET Multiwavelength Network: Architecture, Applications, and Demonstrations", IEEE Journal on Selected Areas in Communications, vol. 8, No. 6, Aug. 1990, pp. 995 of 1004.

C. A. Turkatte, "Examining the Benefits of Tunable Lasers for Provisioning Bandwidth on Demand", EuroForum—Optical Components, Feb. 2001, pp. 1 of 10.

R. Plastow, "Tunable Lasers and Future Optical Networks", Forum—Tunable Laser, Aug. 2000, pp. 58 of 62.

Elizabeth Bruce, "Tunable Lasers", Communications, IEEE Spectrum, Feb. 2002, pp. 35 of 39.

M. G. Littman et al., "Spectrally Narrow Pulsed Dye Laser without Beam Expander", Applied Optics, vol. 17, No. 14, Jul. 15, 1978, pp. 2224 of 2227.

Apte et al., "Deformable Grating Light Valves for High Resolution Displays," Solid State Actuator Workshop, Hilton Head, South Carolina, Jun. 13-16, 1994.

Sene et al., "Polysilicon micromechnical gratings for optical modulation," Sensors and Actuators, vol. A57, pp. 145-151, 1996.

Amm et al., "Invited Paper: Grating Light Valve™ Technology: Update and Novel Applications," SID Digest, vol. 29, 1998.

Development of Digital MEMS-Based Display Technology Promises Improved Resolution, Contrast, and Speed, XP-000730009, 1997, pp. 33 of 34.

"Micromachined Opto/Electro/Mechanical Systems," Electronic Systems, NASA Tech Briefs, Mar. 1997, pp. 50 & 52.

S.T. Pai, et al., "Electromigration in Metals", Received Jun. 4, 1976, pp. 103-115.

Olga B. Spahn, et al., "High Optical Power Handling of Pop-Up Microelectromechanical Mirrors", Sandia National Laboratories, IEEE 2000, p. 51-52.

David M. Burns, et al. "Optical Power Induced Damage to Microelectromechanical Mirrors", Sensors and Actuators A 70, 1998, p. 6-14.

V.S. Aliev et al., "Development of Si(100) surface roughness at the initial stage of etching in F2 and XeF2 gases: ellipsometric study," Surface Science 442 (1999), pp. 206-214.

Xuan-Qi Wang et al., "Gas-Phase Silicon Etching with Bromine Trifluoride," Depart. of Electrical Engineering, 136-93 California Institute of Technology, 1997 IEEE, pp. 1505-1508.

Harold F. Winters, "Etch products from the reaction of XeF2 with SiO2, Si3N4, SiC, and Si in the presence of Ion Bombardment," IBM Research Laboratory, 1983 American Vacuum Society, pp. 927-931.

F.A. Houle, "Dynamics of SiF4 desorption during etching of silicon by XeF2," J. Chem. Phys. 87 (3), Aug. 1, 1987, pp. 1866-1872.

Mehran Mehregany, "Microelectromechanical Systems," 1993 IEEE, pp. 14-22.

D. Moser et al., "A CMOS Compatible Thermally Excited Silicon Oxide Beam Resonator with Aluminium Mirror," Physical Electronics Laboratory, 1991 IEEE, pp. 547-550.

M. Parameswaran et al., "Commerical CMOS Fabricated Integrated Dynamic Thermal Scene Simulator," 1991 IEEE, pp. 29.4.1-29.4.4.

M. Parameswaran et al., "CMOS Electrothermal Microactuators," Depart. of Electrical Engineering, 1990 IEEE, pp. 128-131.

U. Streller et al., "Selectivity in dry etching of Si(100) with XeF2 and VUV light," Applied Surface Science 106, (1996), pp. 341-346.

M.J.M Vugts et al., "Si/XeF2 etching: Temperature dependence," 1996 American Vacuum Society, pp. 2766-2774.

P. Krummenacher et al., "Smart Temperature Sensor in CMOS Technology," Sensors and Actuators, A-21-A-23 (1990), pp. 636-638.

Henry Baltes, "CMOS as sensor technology," Sensors and Actuators A. 37-38, (1993), pp. 51-56.

Thomas Boltshauser et al., "Piezoresistive Membrane Hygrometers Based on IC Technology," Sensor and Materials, 5, 3, (1993), pp. 125-134.

Z. Parpia et al., "Modelling of CMOS Compatible High Voltage Device Structures," pp. 41-50.

Jon Gildemeister, "Xenon Difluoride Etching System," 1997, UC Berkeley MicroTabrication Manual Chapter 7.15, p. 2-5.

W. Riethmuller et al., "A smart accelerometer with on-chip electronics fabricated by a commercial CMOS process," Sensors and Actuators A. 31, (1992), 121-124.

W. Gopel et al., "Sensors—A Comprehensive Survey," vol. 7, Weinheim New York, 44 pgs.

D. E. Ibbotson et al., "Comparison of XeF2 and F-atom reations with Si and SiO2," 1984 American Institute of Physics, pp. 1129-1131.

D. E. Ibbotson et al., "Plasmaless dry etching of silicon with fluorine-containing compounds," 1984 American Institute of Physics, pp. 2939-2942.

M.H. Hecht et al., "A novel x-ray photoelectron spectroscopy study of the Al/SiO2 interfaces," 1985 American Institute of Physics, pp. 5256-52616.

Daniel L. Flamm et al., "XeF2 and F-Atom Reactions with Si: Their Significance for Plasma Etching,," Solid State Technology, V. 26, #4, Apr. 1983, pp. 117-121.

H.F. Winters et al., "The etching of silicon with XeF2 vapor," Appl. Phys. Lett. vol. 34, No. 1, Jan. 1979, pp. 70-73.

Wayne Bailey et al., "Microelectronic Structures and Microelectromechanical Devices for Optical Processing and Multimedia Applications," SPIE—The International Society for Optical Engineering, vol. 2641, Oct. 1995, 13 pgs.

J. Marshall et al., "Realizing Suspended Structures on Chips Fabricated by CMOS Foundry Processes Through the MOSIS Service," National Inst. of Standards and Technology, Jun. 1994, 63 pgs.

David Moser et al., "CMOS Flow Sensors," 1993 Physical Electronics Lab, Swiss Federal Institute of Tech, Zurich, Switzerland, 195 pgs.

E. Hecht, "Optics", Addison-Wesley, 2$^{nd}$ edition, 1987, Adelphi University, pp. 163-169.

E. Hecht, "Optics", Addison-Wesley, 2$^{nd}$ edition, 1987, Adelphi University, pp. 358-360.

T. Glaser et al., "Beam switching with binary single-order diffractive grating", XP-000802142, Optics Letters, Dec. 15, 1998, vol. 23, No. 24, pp. 1933 of 1935.

P. C. Kundu et al., "Reduction of Speckle Noise by Varying the Polarisation of Illuminating Beam", XP-002183475, Dept. of Applied Physics, Calcutta University, 1975, pp. 63-67.

J. W. Goodman, "Some Fundamental Properties of Speckle", XP-002181682, Dept. of Electrical Engineering, Stanford University, 1976, pp. 1146-1150.

Lingli Wang et al., "Speckle Reduction in Laser Projection Systems by Diffractive Optical Elements", XP-000754330, Applied Optics, Apr. 1, 1998, vol. 37, No. 10, pp. 1770-1775.

R.W. Corrigan et al., "Calibration of a Scanned Linear Grating Light-Valve, Projection System for E-Cinema Applications", Silicon Light Machines, SID'99, San Jose, CA, 27 pgs, 1999.

R.W. Corrigan et al., "Calibration of a Scanned Linear Grating Light-Valve, Projection System", Silicon Light Machines, San Jose, CA, 4 pgs, May 18, 1999.

"Introduction to Cryptography", http://www.ssh.fi/tech/crpto/into.html, 35 pgs, Jun. 21, 1999.

"Deep Sky Black," Equinox Interscience, www.eisci.com/deepsky.html, 1997.

"Absorptive Neutral Density Filters," Newport Corp., Irvine, CA, www.newport.com, May 7, 1999.

"High Energy Variable Attenuators," Newport Corp., Irvine, CA, www.newport.com, May 7, 1999.

"Neutral-Density Filters," New Focus, Inc., Santa Clara, CA, www.newfocus.com, May 7, 1999.

J. Hawkes et al., "Laser Theory and Practice," Prentice Hall, New York, 1995, pp. 407-408.

C. Tew et al., "Electronic Control of a Digital Micromirror Device for Projection Displays", Proceedings of the 1994 IEEE International Solid-State Circuits Conference, 1994.

Henck, S.A., "Lubrication of Digital Mircomirror Devices™", Tribology Letters, No. 3, pp. 239-247, 1997.

K. W. Goossen et al., "Silicon Modulator Based on Mechanically-Active Anti-Reflection Layer with 1 Mbit/sec Capability for Fiber-in-the-Loop Applications", IEEE Photonics Technology Letters, vol. 6, No. 9, Sep. 1994, pp. 1119-1121.

J. A. Walker et al., "Demonstration of a Gain Flattened Optical Amplifier with Micromechanical Equalizer Element", Lucent Technologies, pp. 13-14.

A. P. Payne et al., "Resonance Measurements of Stresses in Al/Si$_3$N$_4$ Micro-Ribbons", Silicon Light Machines, Sep. 22, 1999, 11 pgs.

M. W. Miles, "A New Reflective FPD Technology Using Interferometric Modulation", 4 pgs.

N. A. Riza et al., "Digitally Controlled Fault-Tolerant Multiwavelength Programmable Fiber-Optic Attenuator Using a Two-Dimensional Digital Micromirror Device", Optics Letters, Mar. 1, 1999, vol. 24, No. 5, pp. 282-284.

N. A. Riza et al., "Synchronous Amplitude and Time Control for an Optimum Dynamic Range Variable Photonic Delay Line", Applied Optics, Apr. 10, 1999, vol. 38, No. 11, pp. 2309-2318.

P. Alvelda et al., "44.4: Ferroelectric Microdisplays Using Distortion-Compensated Pixel Layouts", SID 95 DIGEST, XP 2020715, pp. 931-933.

Apte et al., "Deformable Grating Light Valves for High Resolution Displays," Solid State Actuator Workshop, Hilton Head, South Carolina, Jun. 13-16, 1994.

Sene et al., "Polysilicon micromechanical gratings for optical modulation," Sensors and Actuators, vol. A57, pp. 145-151, 1996.

Amm et al., "*Invited Paper:* Grating Light Valve™ Technology: Update and Novel Applications," SID Digest, vol. 29, 1998.

"Development of Digital MEMS-Based Display Technology Promises Improved Resolution, Contrast, And Speed", XP-000730009, 1997, p. 33 of 34.

\* cited by examiner

MICRO-STRUCTURES WITH INDIVIDUALLY ADDRESSABLE RIBBON PAIRS

FIELD OF THE INVENTION

This invention relates MEM devices. More particularly, this invention relates to MEM devices having an array of ribbon pairs which are individually addressable.

BACKGROUND OF THE INVENTION

Optical MEM (micro-electro-mechanical) devices have applications in display, print, optical and electrical technologies. An optical MEM device, herein, is a device that is capable of constructively and destructively interfering with an incident light source to produce an optical signal or optical signals. Exemplary optical MEM devices, and methods for making the same, are disclosed in U.S. Pat. Nos. 5,311,360, 5,841,579 and 5,808,797, issued to Bloom et al., the contents of which are hereby incorporated by reference.

Optical MEM devices can be fabricated from Si-based materials using lithographic techniques. Optical MEM devices can have reflective ribbons that are formed over a suitable substrate structure such that the ribbons are spatially arranged in parallel and are coupled to the substrate structure. In use, a portion of the reflective ribbons can be moved by applying an operating bias voltage, or switching voltage, across the ribbons and the substrate structure. By alternating, or switching, the potential of the bias voltage, the ribbons are alternated between the positions for constructive and destructive interference with the incident light source to generate optical signals.

Variations in the optical signals can occur for a variety of reasons including polarization of the light, interactions of the light with the ribbon edges, light loss through spaces between the ribbons and aging effects. Variability in the optical signals can be catastrophic in applications where consistent or reproducible optical signals are required, such as in the case of optic communications. Therefore, there is a need for an optical MEM device that is capable of producing stable or reproducible optical signals during operation.

SUMMARY OF THE INVENTION

The current invention is directed to a micro-device, system and method which utilize a plurality of ribbon pairs. The ribbon pairs preferably comprise reflective surfaces and are configured to move relative to each other to generate optical signals from an incident light source. Preferably, the ribbons are suspended over a suitable substrate structure, wherein the ribbon pairs comprise a bias ribbon and an active ribbon. The active ribbons are configured to be moved by applying a sufficient bias voltage across the movable active ribbons and the substrate structure, while the bias ribbons preferably remain stationary. Alternatively, both ribbons of the ribbon pairs can be configured to move. For example, adjacent ribbons of a ribbon pair can be configured to move in opposite directions by applying opposing bias voltages to the adjacent ribbons relative to a substrate potential. In yet further embodiments of the invention, the ribbon pairs comprise bias ribbons that are formed on and are fixed to the substrate structure. In accordance with this embodiment, the active ribbons are suspended over the substrate structure and are configured to move relative to the fixed and stationary bias ribbons. Regardless of the particular ribbon configuration that is chosen, the ribbon pairs are preferably configured to be individually addressed.

The ribbons preferably comprise silicon nitride with reflective aluminum layers. The ribbons can have any number of geometries and dimensions but are preferably elongated ribbons that are arranged in parallel. The ribbons are preferably within a range of 2.0 to 20 microns wide and within a range of 20 to 2,000 microns long. Accordingly, the ribbons can effectively modulate light or generated optical signals from light having wavelengths in a range of 0.4 to 2.0 microns. The light can be a pulsed or continuous light and can include one or more wavelengths, depending on the application at hand.

A system in accordance with the present invention comprises optical fibers which are preferably individually coupled to individual ribbon pairs. Each of the ribbon pairs are coupled to a driver circuit, or voltage source, through a unique conductive lead for individually controlling the operating voltages applied to each of the ribbon pairs.

In accordance with the method of the present invention, optical signals are generated from each of the ribbon pairs individually and are registered individually to generate a data set. Preferably, the optical signals are registered through optical fibers which are configured to capture and transmit the optical signals over an optical network. In operation, a new data set is generated by selectively moving a portion of the ribbon pairs.

The system of the present invention can further comprise a compatible device for interfacing with the optical MEM device. The system can further include a converter for converting optical signals into electrical signals, which can then be transmitted by wireless means and/or over other suitable networks, including the internet.

DETAILED DESCRIPTION OF THE EMBODIMENTS

Figure 1A:
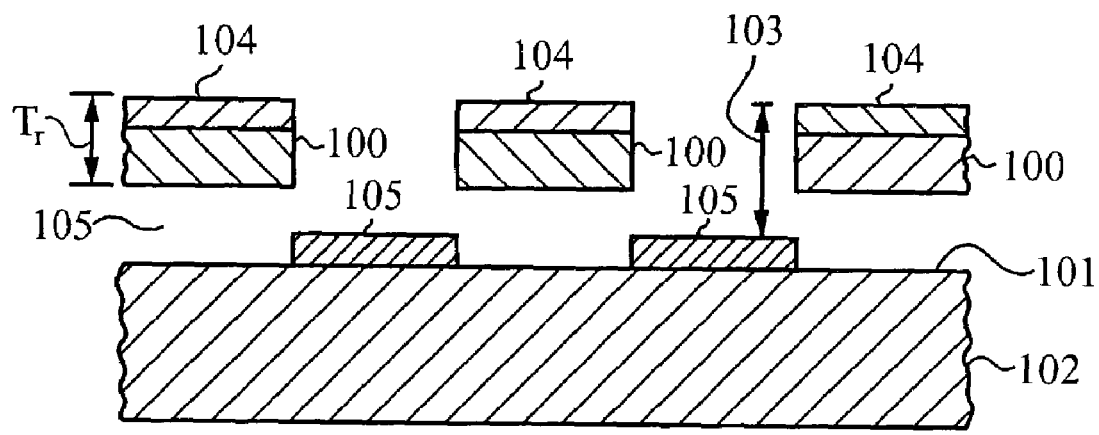
FIGS. 1a–b are cross-sectional representations of a micro-structure comprising a plurality of moveable ribbon structures, in accordance with the present invention.

Referring to FIG. 1a, the optical MEM device can have a plurality of movable ribbons 100 that are spatially arranged over a substrate 102 and a plurality of fixed ribbons 105 spatially arranged over a substrate 102 between movable ribbons 100, such that adjacent ribbons 100 and 105 form ribbon pairs. The surfaces 104, corresponding to the ribbon tops and the fixed ribbons 105, are reflective. The surfaces 104 and 105 are made to be reflective by depositing a thin film of reflective material, such as silver or aluminum on the ribbons 100 and on the substrate 102 between the ribbons 100. The ribbons 100 and the substrate 102 are microfabricated from silicon-based materials such as silicon nitride. The height difference 103 between the reflective surfaces 104 and 105 are configured to be $\lambda/2$ when the ribbons 100 are in the up position as shown in FIG. 1a. When light having a wavelength $\lambda$ impinges on the compliment of reflective surfaces 104 and 105, light that is reflected from the surfaces 104 and 105 will be in phase. Light which strikes the reflective surfaces 105 travels $\lambda/2$ further than the light striking the reflective surfaces 104. Then the portion of light that is reflected back from the reflective surfaces 105 traveling an addition $\lambda/2$ for a total of one complete wavelength $\lambda$. Therefore, the compliment of the reflective surfaces 104 and 105 function as a mirror to the incident light source with a wavelength $\lambda$.

Figure 1B:
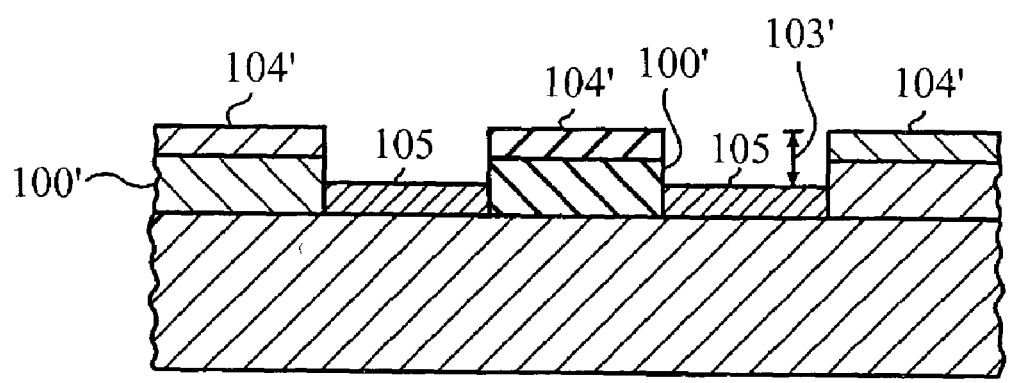

By applying an appropriate bias voltages across the ribbons 100 and the substrate 102, a portion of the ribbons 100 move towards the substrate 102, as shown in FIG. 1b. The thickness $T_r$ of the ribbons 100 can be designed to be $\lambda/4$ such that the distance 103' is also $\lambda/4$. When light having a wavelength $\lambda$ impinges on reflective surfaces 104' and 105 with the ribbons 100 in the down position, as shown in FIG. 1b, the portion of light reflected from the surfaces 104' will be out of phase with the portion of light reflected from the surfaces 105, thereby generating the conditions for destructive interference. By alternating the ribbons 100 between the positions for constructive interference, as shown in FIG. 1a, and the positions for destructive interference, as shown in FIG. 1b, the optical MEM device is capable of modulating light having a wavelength $\lambda$ to produce an optical signal.

Figure 2A:
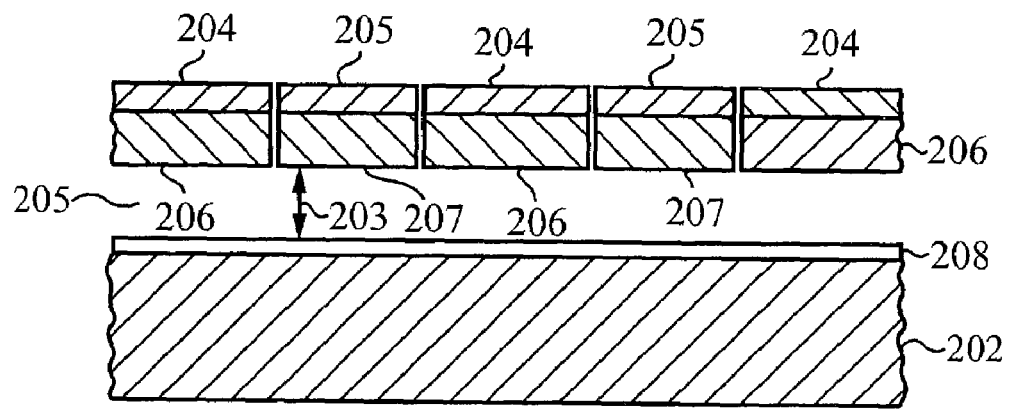
FIGS. 2 a–b are cross-sectional representations of a micro-structure comprising two sets of ribbon structures, in accordance with the present invention.
Figure 2B:
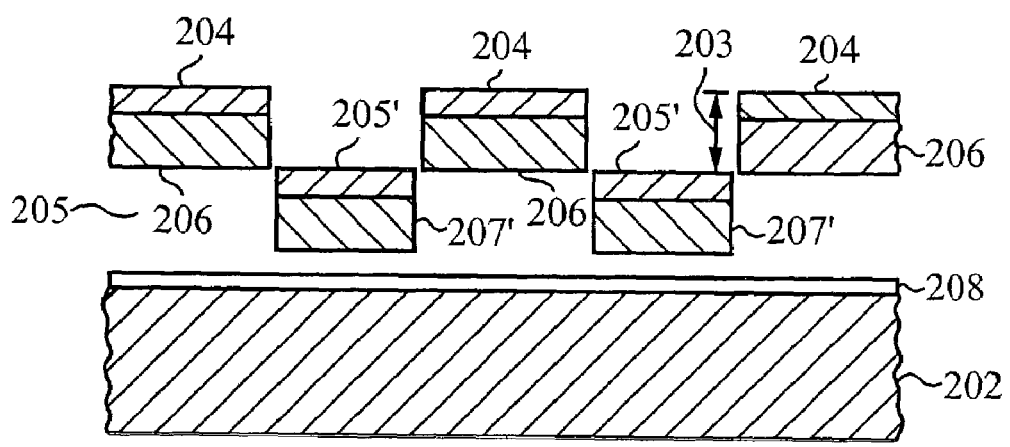

FIGS. 2a–b illustrate cross sectional views of an optical MEM device, in accordance with an alternative construction. The optical MEM device can have pairs of alternating ribbons 206 and 207 that are approximately in the same reflective plane, wherein adjacent ribbons 206 and 207 form sets or ribbon pairs. Referring to FIG. 2a, the ribbons 206 and 207 are suspended over a substrates structure 202 by a distance 205. The ribbons 206 and 207 are provided with a reflective surfaces 204 and 205, respectively. The surface of the substrate 202, or a portion thereof, can also has a reflective surface 208, which is conductive. The reflective surfaces of the substrate 208 and the reflective surfaces of the ribbons 204 and 205 are preferably configured to be separated by a distance approximately equal to a multiple of $\lambda/2$ of the impinging light source. Thus, the portion of light that is reflected from the compliment of surfaces 204, 205 and 208 are all phase, constructively interfere and the maximum intensity is observed. In operation, the optical MEM device alternates between the conditions for constructive and destructive interference by moving the first set of ribbons 206 or the second set of ribbons 207 relative to each other by a distance corresponding to $\lambda$.

In one mode of operation, light is modulated by moving one set of alternating ribbons relative to a stationary set of alternating ribbons. The ribbons that are moved are referred to as the active ribbons and the stationary ribbons are referred to as the bias ribbons. The active ribbons are moved by any number of means including mechanical means, but are preferably moved by applying a sufficient bias voltage across the active ribbon and the substrate to generate Coulombic attractions between the active ribbons and the substrate.

Now referring to FIG. 2b, when a sufficient bias voltage is applied across the active of ribbons 207 and the substrate 202, the ribbons 207 are displaced relative to the bias ribbons 206 by a distance 203 that is approximately equal to a multiple of $\lambda/4$. Accordingly, the portions of light that are reflected from the surfaces 205' of the active ribbons 207 will destructively interfere with the portion of light that are reflected of the surfaces 204 of the bias ribbons 206. It will be clear to one skilled in the art that an optical MEM device may be configured to modulated an incident light source with a wavelength $\lambda$ in other operative modes. For example, both sets of ribbons 206 and 207 may be configured to move and separate by multiples of $\lambda/4$ in order to alternate between the conditions for constrictive and destructive interference to generate an optical signal. The optical MEM devices described in FIGS. 1a–b and FIGS. 2a–b are provide to facilitate understanding of the invention. However, it is understood that any number of optical MEM constructions with contact ribbons and/or non-contact ribbons are considered to be within the scope of the invention.

For display applications several ribbon pairs of an optical MEM device can be used to create a single pixel. Accordingly, the ribbon pairs are said to be simultaneously addressed and/or collectively switched between the conditions for constructive and destructive interference. In the design of display devices, the ribbons are preferably optimized for the wavelengths of light that are used to from a visible image; generally around 0.5 micron. Ribbon geometries are also preferably optimized to exhibit physical properties, such as tension and stress, which allow the ribbons to be operated at reasonable switching voltages.

For display applications, the light that is used to form an image preferably correspond to the first order diffracted light that is diffracted at an angle from the surfaces ribbons. The light that is reflected back, and which is substantially normal to the surfaces of the ribbons, is generally blocked or filtered. Also in display applications, the light source is generally fixed with respect to the ribbons and generally exhibits random polarizations. The fixed and random polarizations of the light typically lead to small negligible effects on the image produced.

For optical communications, the light that is used to transmit light over an optical network preferably correspond to light having wavelengths around 1.5 microns. In order for an optical MEM device to effectively modulate light or to generate optical signals from light having wavelengths around 1.5, the ribbon geometries need to be significantly modified from the geometries of the ribbons used in optical display MEM devices. Specifically, the geometries of the ribbons need to be fabricated to exhibit suitable diffraction properties for these longer wavelengths. For most MEM systems, the diffraction angle $\theta$ is preferably about 4.0 degrees according to the equation $\sin \theta = \lambda/W$, wherein $\lambda$ is the wavelength of the incident light used and W is the width of a pair of diffracting or adjacent ribbons. Changing the dimensions of the ribbons changes the stress and tension across the ribbons, as well as other mechanical and electrical properties of the ribbons. In order to fabricate ribbon that can be operated with reasonable switching voltages, the ribbons need to be made longer.

A further challenge for making optical MEM device suitable for use in optical communications is that the MEM device is preferably as insensitive as possible to polarizations of the incident light. In the case of optical communication systems, the source used is not necessarily stable or fixed with respect to the optical MEM device. Specifically, light is generally transmitted over an optical fiber or a fiber optic network which can be subject to movements or vibrations. These movements or vibrations can cause the light to be polarized in one direction or the other. Regardless of which polarization is favored at any given time, polarized light generally leads to diminished signal intensities. This phenomenon is referred to herein as time dependent polarization light loss which has been observed to worsen as wavelength of the light used increases and as the number of ribbon edges used to generated a signal is increased. Further polarization light loss has been observed to be a complex function of the ribbon dimensions and the ribbon spacing, which again proposes challenges because the physical properties of the ribbons, as determined in-part by the ribbon lengths, need to be balanced against the time dependent polarization light loss effects.

The present invention is directed to an optical MEM device and system which has an array of ribbon pairs that are individually addressable and which can have applications in optical communications. The device and system is preferably configured to minimize light loss associated with ribbon edges, polarization effects and combinations thereof. Further, the current invention is directed to an optical MEM device which has an array of ribbon pairs that are capable of being individually illuminated, individually addressed and individually registered.

Figure 3A:
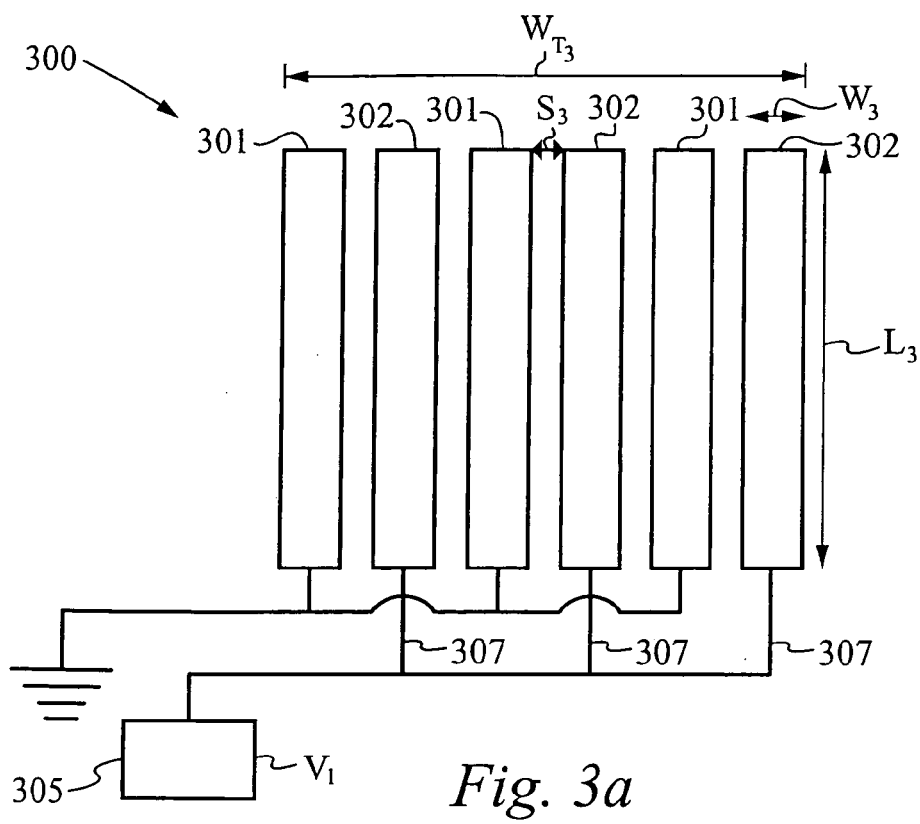
FIG. 3a illustrates a schematic representation a set of addressable ribbons that can be used to form a pixel in display applications.
Figure 3B:
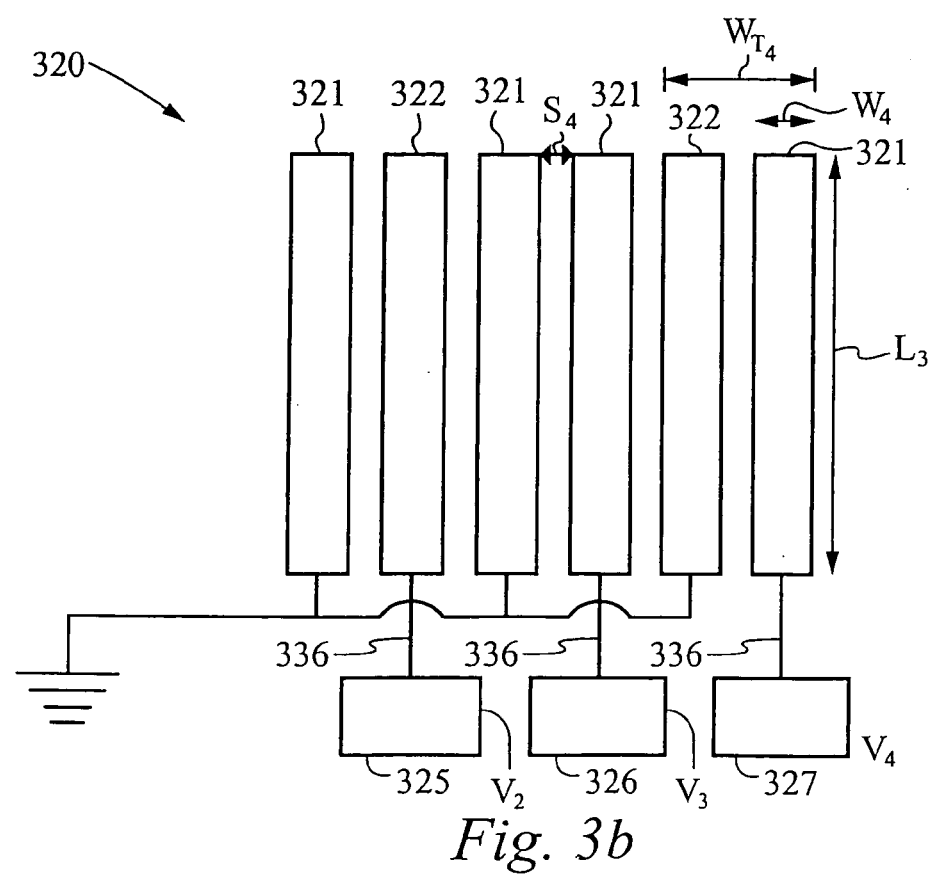
FIG. 3b illustrates a schematic representation of individually addressable ribbon pairs, in accordance with the present invention.

FIGS. 3a–b illustrate schematic representations of ribbon units 300 and 320 each comprising ribbons that are preferably arranged in a parallel over a substrate structure (not shown) and which are preferably coupled to the substrate structure through suitable post and/or anchor features (not shown). It is understood that the ribbons are preferably sealed within a hermetic package comprising an optically transparent window, such as described in U.S. Pat. No. 6,303,986, to Shook entitled "METHOD OF AND APPARATUS FOR SEALING AN HERETIC LID TO A SEMI CONDUCTOR", the contents of which is hereby incorporated by reference.

Now referring to FIG. 3a, the set of ribbons 300 represents one addressable unit of ribbons. The set of ribbons 300 comprise adjacent ribbon pairs 301 and 302 with reflective surfaces and which are configured to move relative to each other, as previously explained. In display applications, an addressable ribbon unit generally comprises three or more ribbon pairs, as shown by the set of ribbons 300. The three or more ribbon pairs are used to collectively generate one pixel of an image. In operation, each of the active ribbons 302 within the addressable ribbon unit 300 are subjected to a switching voltage $V_1$ delivered to the active ribbons 302 from a driver circuit 305 that is coupled to each of the active ribbons 302 through conductive leads 307. The bias ribbons 301 are preferably stationary and are maintained at the same potential as the substrate structure. Specifically, the bias ribbons 301 and the substrate structure are both preferably grounded. The bias ribbons 301 can be either formed directly on the substrate, such as illustrated in FIGS. 1a–b, or can be suspended over the substrate structure in the same or a different plane with the active ribbons 302, such as illustrated in FIGS. 2a–b.

Still referring to FIG. 3a, in display applications the ribbons 301 and 302 are preferably in a range of, 2.0 to 20 microns in width $W_3$, and in a range of 20 to 2,000 microns in length $L_3$. These ribbon geometries provide are preferably for making an optical MEM devices that is capable of modulating light having wavelengths in a range of 0.4 to 2 microns. The separations $S_3$ between each adjacent ribbon pair 301 and 302 are preferably as small as possible to reduce light loss, but are generally on the order of 0.25 to 1.0 microns, as determined by the limitations of the process used to from the ribbons. The total width $W_{T3}$ of the addressable ribbon unit 300 is up to 80 microns.

Referring now to FIG. 3b, a set or array of ribbon pairs 320, in accordance with the present invention comprise alternating active ribbon 321 and bias ribbon 322, as described previously. However, unlike the set of ribbon pairs 300, shown in FIG. 3a, each adjacent pair of ribbons 321 and 322 from an addressable unit. Accordingly, each ribbon pair 321 and 322 within the set of ribbon pairs 320 is addressable with switching voltages $V_2$, $V_3$ and $V_4$ that are controllably delivered to each ribbon pair individually through conducive leads 326 that are couple to the active ribbons 322. The switching voltages $V_2$, $V_3$ and $V_4$ are delivered to the active ribbons 322 through the conductive leads 326 from driver circuits 325, 326 and 327.

Still referring to FIG. 3b, in optical communications, the ribbons 321 and 322 are preferably in a range of 2.0 to 20 microns wide, and more preferably 5.0 to 20 microns in width $W_4$, allowing the ribbons to effectively modulate and diffract light having one or more wavelength in a range of 0.4 to 2.0 microns. The ribbons 321 and 322 are preferably in a range of 20 to 2,000 microns in length, and more preferably 20 to 60 microns in length $L_3$ in order to allow the ribbons 321 and 322 to be operated at reasonable switching voltages. The separations $S_4$ between adjacent ribbons 321 and 322 are preferably 1.0 micron or less in order to minimize light loss. The total width $W_{T4}$ of each addressable unit, comprising one pair of addressable ribbons 321 and 322, is preferably in a range of 10 to 40 microns.

Figure 4:
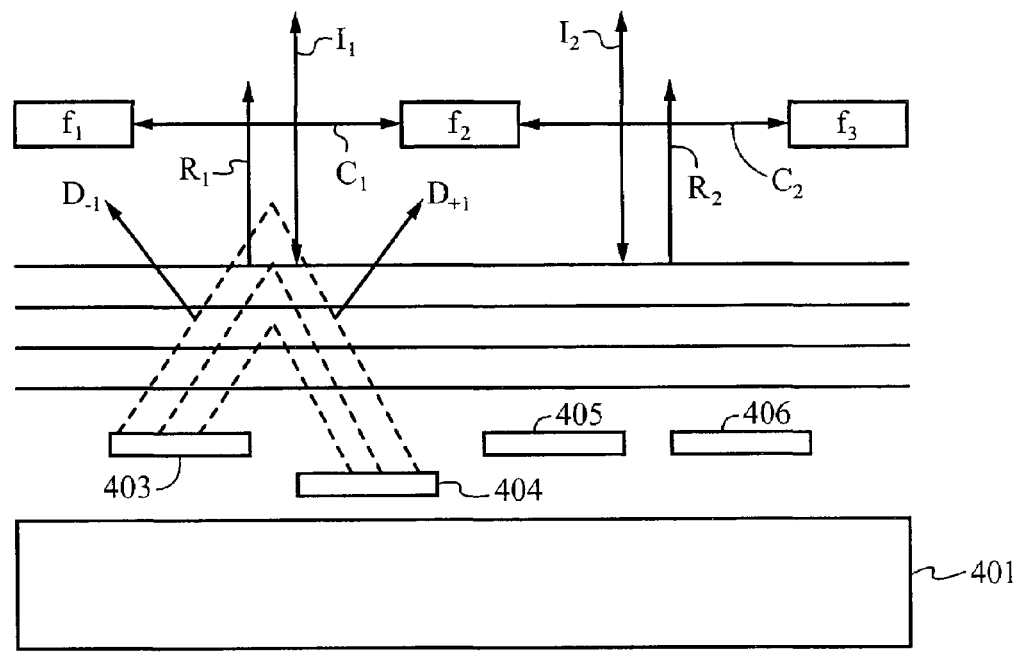
FIG. 4 shows a schematic representation of reflected light used to generate an optical signals, in accordance with a preferred method of the present invention.

FIG. 4 illustrates a schematic representation of two adjacent pairs of ribbons 403/404 and 405/406 that are positioned in parallel over a substrate structure 401, wherein each of the ribbon pairs 403/404 and 405/406 can be individually addressable, individually irradiated and individually registered or interrogated. In operation, a first incident light source $I_1$ is directed to the reflective surfaces of the first ribbon pair 403/404. A portion of the light $I_1$ is reflected $R_1$ back in a direction that is substantially normal to the surfaces of the ribbons 430 and 404. The reflected light $R_1$ passes through a first optical aperture $C_1$ to provide a first optical signal which can be transmitted over an optical fiber network and/or registered using any suitable detection means, including a photo-detector. The ribbons 403 and 404 are illustrated as being in a destructive interference position. Accordingly, most of the light $I_1$ will be diffracted as $D_{+1}$ and $D_{-1}$ and very little of the incident light $I_1$ is reflected back as $R_1$. Accordingly, most of the light will be blocked or filtered by the structures $F_1$ and $F_2$.

Still referring to FIG. 4, directly adjacent to the first pair of ribbons 403 and 404, there is a second pair of individually addressable ribbons 405/406. In operation, a second incident light source $I_2$ is directed onto the reflective surfaces of the second ribbon pair 405/406, while the first incident light source $I_1$ is simultaneously being directed at the first pair of individually addressable ribbons 403/404. A portion of the light $R_2$ that is reflected from the surface of the ribbons 405 and 406 passes through a second optical aperture $C_2$ to provide a second optical signal. The second optical signal can be transmitted over an optical fiber network and/or registered using any suitable detection means, including a photo-detector. The ribbons 405 and 406 are illustrated as being in a position for constructive interference. Accordingly, most of the light $I_2$ is reflected back as $R_2$ and any portion of the light $I_2$ which is diffracted (not shown) will be blocked or filtered by the structures $F_2$ and $F_3$.

Still referring to FIG. 4, in display applications, the diffracted light, illustrated by the vectors $D_{-1}$ and $D_{+1}$, is used to form an image and the reflected light illustrated by the vectors $R_1$ and $R_2$, is blocked or filtered. In contrast to display applications, e.g. communication applications, the reflected light $R_1$ and $R_2$ is used in the transmission of information or optical data, while the diffracted light $D_{-1}$ and $D_{+1}$ is blocked or filtered.

By switching the ribbon pairs 403/404 and 405/406 between the conditions for constructive and destructive interference, a set of optical signals can be generated, wherein the set of optical signals represent data or information. The optical signals can be registered by any number of registration or detection means which may include a converter for converting optical signals onto digital electrical signals. In an optical communications device or system, an array of ribbons can comprise 540 or more individually addressable ribbon pairs used to generate block of data comprises 540 bits.

Figure 5:
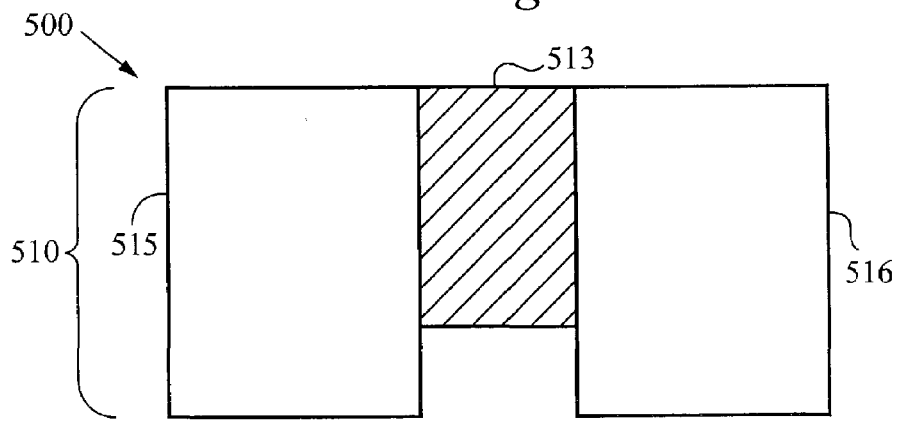
FIG. 5 is a schematic representation of a portion of an optical configuration for transmitting light to and from ribbon pairs, in accordance with the system of the present invention.
Figure 5:
Figure 5:

Referring now to FIG. 5, a system 500, in accordance with an embodiment of the present invention, can comprise an array of ribbon pairs 520, which comprises any number of individually addressable ribbon pairs 503/504 and 505/506. The ribbon pairs 503/504 and 505/506 are preferably coupled to and suspended over a substrate structure 501, as previously described. The system 500 further comprises an optical configuration 510 that is aligned with the array 520. The optical configuration 510 preferably comprises optical fiber units 515 and 516 that comprise individual optical fibers or individual groupings of optical fibers. The optical fiber units 515 and 516 are preferably positioned over individual ribbon pairs 503/504 and 505/506, as shown. The optical fiber units 515 and 516 are configured to deliver light to individual ribbon pairs 503/504 and 505/506 and to transmit reflected light from the same individual ribbon pairs 503/504 and 505/506. The optical configuration 510, preferably also includes a filter means 513 for blocking or filtering light that is diffracted from the ribbon pairs 503/504 and 505/506, as described above.

Still referring to FIG. 5, each fiber unit 515 and 516 can comprise a single fiber configured for transmitting light to a ribbon pairs 503/504 and 505/506 transmitting reflected light from the ribbon pairs 503/504 and 505/506. Alternatively, each of the fiber units 515 and 516 can comprise two or more optical fibers, wherein at least one optical fiber is configured for transmitting light to the ribbon pairs 503/504 and 505/506 and at least one of the fibers is configured to transmit reflected light from the ribbon pairs 503/504 and 505/506. Light may also be transmitted to and from the ribbon pairs using pulsed light or continuous light. Regardless, of the type of optical fibers that are used, each of the optical fiber units is preferably dedicated to single individually addressable ribbon pairs, such as illustrated in FIG. 6.

Figure 6:
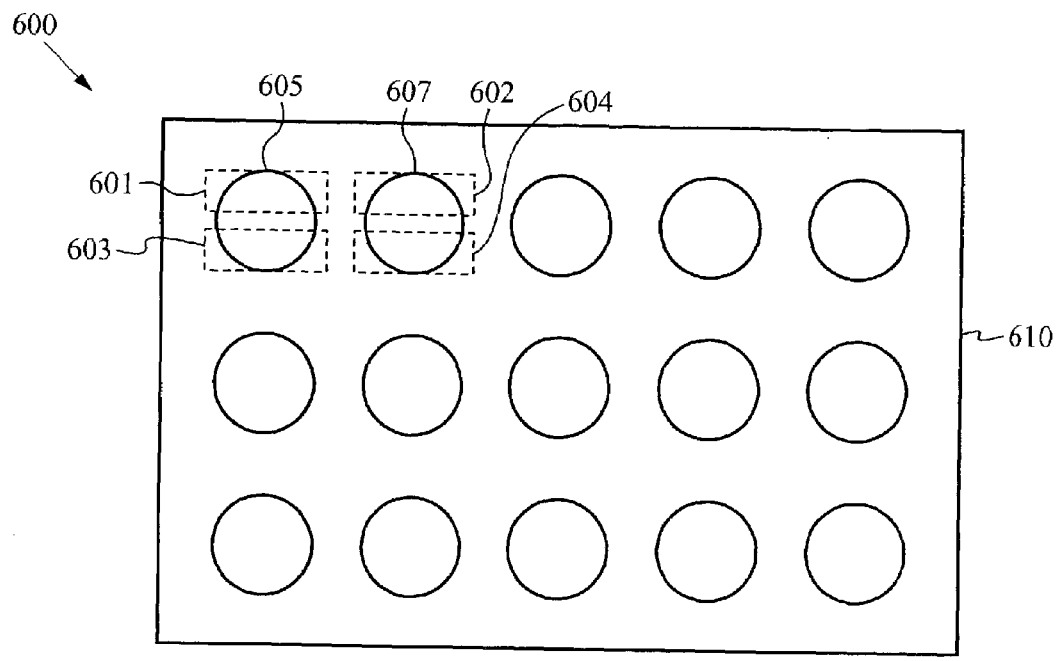
FIG. 6 illustrates an optical fiber array for illuminating and registering an array of ribbon pairs, in accordance with a preferred system of the present invention.

Now referring to FIG. 6, an optical fiber array 600, in accordance with the present invention, comprises an array of optical fiber units 605 and 607 which comprise at least one optical fiber, as explained in detail above. The array 600 can comprise a spacer feature or binder features 610 for holding individual optical fiber units 605 and 607 in position and for aligning the optical fiber units 650 and 607 with the ribbon pairs 601/603 and 602/604.

Figure 7:
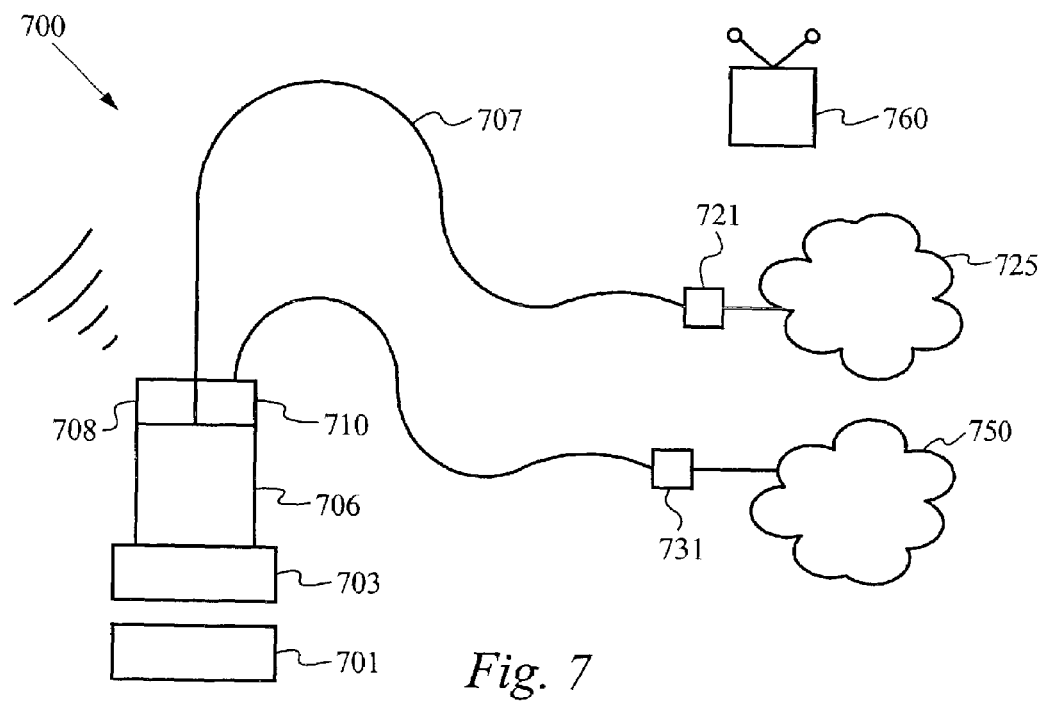
FIG. 7 shows a schematic representation of optical communications system, in accordance with the present invention.

Now referring to FIG. 7, an optical communication system 700, in accordance with an embodiment of the present invention, comprises an array of ribbons 701 coupled to suitable optics 703, which can include an array of optical fiber units, as described above. The optics 703 are preferably configured to transmit light to the array of ribbons 701 and to capture and/or transmit reflected light from the array of ribbons 701, as previously explained. The system 700 also preferably comprises a transmission fiber 707 that is coupled to the optics 703 for transmitting optical signals to an outlet structure 721. The outlet structure 721 is preferably configured to couple to an optical network 725 and transmit the optical signals generated from the array of ribbons 701 over the network 725.

In further embodiments of the invention, the system 700 comprises a converted means 706 for converting the optical signals generated from the array 701 and/or for converting optical signals received from the network 725 into digital electrical signals.

Still referring to FIG. 7, the system 700 can be configured with a conductive transmission line 712 for transmitting and receiving electrical signals. The conductive transmission line 712 is preferably configured with a connector 710 for coupling to a network 725, such as the internet. In still further embodiments of the invention the system 700 is configured with a transmitter 708 and/or a receiver 710 for transiting and receiving wireless information.

The system 700 of the present invention is preferably configured to communicate with a compatible device (not shown). For example, a compatible device can send signals optically over the optical network 725, electrically over the internet 750 or by wireless transmission 702. The system 700 can then generate a proper response comprising optical signals which can be optically transmitted through the fiber transmission line 707 to the optical network 725, converted to electrical signals that can be transmitted electrically through the conductive transmission line 712 to the network 750 or can be converted to radio signals that are transmitted as a wireless transmission 702 from a transmitter 708 to a remote receiver 760.

The current invention provides a device, system for and method of generating optical signal for applications in display communication technologies. The device, system and method utilize an optical MEM structure comprising an array individually addressable ribbon pairs. The geometries of the ribbons are preferably selected to maximize the efficiency of the ribbon pairs to individually modulate light and to enhance the stability of the optical signals generated by reducing the light loss due to polarization effects.

The present invention has been described in terms of specific embodiments incorporating details to facilitate the understanding of the principles of construction and operation of the invention. While the preferred micro-device of the present invention an optical MEMS device, the invention in contemplated to be useful for making any number of micro-structure were single ribbon pair addressability provides and advantage. As such, references, herein, to specific embodiments and details thereof are not intended to limit the scope of the claims appended hereto. It will be apparent to those skilled in the art that modifications can be made in the embodiment chosen for illustration without departing from the spirit and scope of the invention.

What is claimed is:

1. A micro-device comprising:
   a. a plurality of ribbon pairs configured to move relative to each other, each ribbon pair being individually addressable separately from other ribbon pairs in the plurality of ribbon pairs, each ribbon pair comprising a movable active ribbon and a stationary bias ribbon suspended over a substrate;
   b. a light source for directing beams of light to the plurality of ribbon pairs; and c. a driver circuit in electrical communication with at least a single ribbon pair to selectively control the single ribbon pair from among the plurality of ribbon pairs.

2. The device of claim 1, wherein the ribbon pairs are configured for modulating light.

3. The device of claim 2, wherein the light source comprises optical fibers, wherein individual optical fibers are in communication with individual ribbon pairs.

4. The system of claim 3, wherein the light source is configured for generating light comprising a wavelength in a range of 0.4 to 2.0 microns.

5. The device of claim 1, wherein the ribbon pairs comprise ribbons that are in a range of 5.0 to 20 microns wide.

6. The device of claim 1, wherein the ribbon pairs comprise ribbons that are in a range of 20 to 60 microns long.

7. The device of claim 1, wherein each ribbon pair comprises silicon nitride with a reflective aluminum layer.

* * * * *